United States Patent [19]

Tanaka et al.

[11] Patent Number: 5,586,255
[45] Date of Patent: Dec. 17, 1996

[54] NETWORK MANAGEMENT OPERATION SYSTEM AND NETWORK MANAGEMENT OPERATION METHOD

[76] Inventors: Yasuhiro Tanaka, 1170, Ozenji, Asao-ku, Kawasaki-shi; Yasuhiko Nagai, 13-12, Hongo-4-chome, Bunkyo-ku, Tokyo; Michio Suzuki, 569-1-26-103, Kamoshidacho, Midori-ku, Yokohama-shi; Takashi Kagei, 8-16, Susukino-3-chome, Midori-ku, Yokohama-shi; Masato Saito, 31-5-701, Hiyoshihoncho-6-chome, Kohoku-ku, Yokohama-shi; Goro Ikeba, 105, Kamisugetacho, Hodogaya-ku, Yokohama-shi, all of Japan

[21] Appl. No.: 31,686

[22] Filed: Mar. 15, 1993

[30] Foreign Application Priority Data

Mar. 17, 1992 [JP] Japan ................................. 4-059985

[51] Int. Cl.⁶ ........................................... G06F 15/00
[52] U.S. Cl. ............... 395/200.01; 395/800; 395/200.11; 395/326
[58] Field of Search ................................ 395/800, 200, 395/700; 370/60, 85.6; 364/DIG. 1

[56] References Cited

U.S. PATENT DOCUMENTS

| | | | |
|---|---|---|---|
| 5,241,624 | 8/1993 | Torres | 395/129 |
| 5,295,139 | 3/1994 | Palmer | 370/60 |
| 5,295,244 | 3/1994 | Dev et al. | 395/161 |
| 5,317,742 | 5/1994 | Bapat | 395/700 |
| 5,452,433 | 9/1995 | Nihart et al. | 395/500 |

OTHER PUBLICATIONS

Modiri, "An Implementation of the Common Network Management Information Service Element Interfaces", *IEEE Communications Magazine*, Jul. 1991, pp. 29–38.

Tjaden et al., "Integrated Network Management for Real-Time Operations, *IEEE Network–The Magazine of Computer Communications*" Mar. 1991, p. 10–15.

Maymon, "An Information Model for Configuration Management of Switching Network Elements, Using OSI Tools", IEEE 1991 International Conference, pp. 118–122.

*Primary Examiner*—Alyssa H. Bowler
*Assistant Examiner*—Walter D. Davis

[57] ABSTRACT

In a network management operation system connected via a communication line to a network having a plurality of object instances to be managed, the management information database stores management information of the containment relationship between object instances in the form of table. When an operator designates some object instances and enters a control command for the designated object instances, the management information of the designated object instances is retrieved from the management information database and a containment tree (management information having a containment structure) corresponding to the containment relationship between the designated object instances is generated, respectively within the network management operation system. In accordance with the generated containment tree, a scope pattern of Common Management Information Service (CMIS) of Open Systems Interconnection (OSI) is automatically generated.

6 Claims, 30 Drawing Sheets

FIG. 8

| OBJECT CLASS | ICON DATA |
|---|---|
| HOST | |
| SWITCH | |
| MULTIPLEXER | |
| TERMINAL | |

| | | |
|---|---|---|
| 101 | MANAGED OBJECT INSTANCE | 1.1.1.2 |
| 102 | SCOPE TYPE | (NULL) |
| 103 | NUMBER OF HIERARCHICAL LEVELS | (NULL) |
| 104 | MANAGEMENT OPERATION TYPE | GET |
| 105 | ATTRIBUTE TYPE | OPERATION STATUS |

| MANAGED OBJECT INSTANCE | $N_{n,i}$ | $B_{n,i}$ | $C_{n,i}$ |
|---|---|---|---|
| 1. 1. 2. 2 | 0 | 0 | 1 |
| 1. 1. 2. 1 | 0 | 0 | 1 |
| 1. 1. 1. 2 | 0 | 0 | 1 |
| 1. 1. 1. 1 | 0 | 0 | 1 |
| 1. 1. 2 | 0 | 0 | 1 |
| 1. 1. 1 | 0 | 0 | 1 |
| 1. 1 | 0 | 0 | 1 |

| MANAGED OBJECT INSTANCE | $N_{n,i}$ | $B_{n,i}$ | $C_{n,i}$ |
|---|---|---|---|
| 1. 1. 2. 2 | 0 | 0 | 1 → -1 |
| 1. 1. 2. 1 | 0 | 0 | 1 → -1 |
| 1. 1. 1. 2 | 0 | 0 | 1 → -1 |
| 1. 1. 1. 1 | 0 | 0 | 1 → -1 |
| 1. 1. 2 | 0 → 1 | 0 → 1 | 1 |
| 1. 1. 1 | 0 → 1 | 0 → 1 | 1 |
| 1. 1 | 0 | 0 | 1 |

FIG. 23

| MANAGET OBJECT INSTANCE | $N_{n,i}$ | $B_{n,i}$ | $C_{n,i}$ |
|---|---|---|---|
| 1. 1. 2. 2 | 0 | 0 | -1 |
| 1. 1. 2. 1 | 0 | 0 | -1 |
| 1. 1. 1. 2 | 0 | 0 | -1 |
| 1. 1. 1. 1 | 0 | 0 | -1 |
| 1. 1. 2 | 1 → 0 | 1 → 0 | 1 → -1 |
| 1. 1. 1 | 1 → 0 | 1 → 0 | 1 → -1 |
| 1. 1 | 1 → 2 | 0 → 1 | 1 |

| | | |
|---|---|---|
| 101 | BASE OBJECT INSTANCE | 1. 2 |
| 102 | SCOPE TYPE | 2 |
| 103 | NUMBER OF HIERARCHICAL LEVELS | 2 |
| 104 | MANAGEMENT OPERATION TYPE | GET |
| 105 | ATTRIBUTE TYPE | OPERATION STATUS |

100

| USER 45A | OPERATION PRIVILEGE LEVEL 45B |
|---|---|
| MR. TANAKA | B |
| MR. SUZUKI | A |
| MR. SATO | B |

| BASE OBJECT INSTANCE | 1.2 | ~101 |
|---|---|---|
| SCOPE TYPE | 2 | ~102 |
| NUMBER OF HIERARCHICAL LEVEL | 2 | ~103 |
| MANAGEMENT OPERATION TYPE | GET | ~104 |
| ATTRIBUTE TYPE | OPERATION STATUS | ~105 |
| ATTRIBUTE VALUE | 1 | ~106 |

1

NETWORK MANAGEMENT OPERATION SYSTEM AND NETWORK MANAGEMENT OPERATION METHOD

BACKGROUND OF THE INVENTION

The present invention relates to a communication network having configuration elements or object instances such as switches and multipliers, and more particularly to a network management operation system capable of efficiently processing the management operation for object instances of a communication network.

A network management operation system has a management information base (MIB) reflecting a predefined containment relationship between network object instances, to efficiently manage the communication network. A technique of filtering information sent from managed object instances and displaying the filtered information on a display device, by using the management information base, is described, for example, in IEEE Network Magazine, March 1991, pp. 10 to 15.

This document proposes to use the management information of a containment relationship only in filtering and displaying reports from managed object instances. In the practical network management, information communicated between a manager and managed object instances includes not only reports sent from the managed object instances to the network management operation system, but also control commands sent from the system to the object instances to be managed. An efficient management operation method taking such bi-directional communications into consideration has been expected.

SUMMARY OF THE INVENTION

It is an object of the present invention to provide a network management operation system capable of allowing a user to efficiently process the management operation for object instances within the network without worrying about the containment relationship between network object instances to be managed, by using the scope function of Common Management Information Service (CMIS) of Open Systems Interconnection (OSI).

The above object can be achieved by the network management operation system of the present invention. According to one aspect of the present invention, the management information database has a screen information table for storing screen information to used for the display of the network configuration on a display device, and a management information table for storing management information of each object instance to be managed. The management information table is a set of management data records provided for each object instance to be managed. Each management data record includes an object class identifier for identifying an icon to be displayed on the display device, attribute information representing the condition of the object instance to be managed, and associative information of the object instance to be managed, relative to other object instances. The management data records are interlinked together to form a tree structure representing the containment relationship between network object instances to the managed.

The features of the present invention reside in that the network management operation system is provided with a scope parameter determining means (program) for automatically generating a CMIS scope pattern (scope parameters having a base object instance and the number of hierarchical levels for identifying a partial tree), by using the management information database storing the containment relationship between object instances designated by an operator. Specifically, in response to an operator designation of an object instance or instances displayed on the display device and in response to an operator selection of a control command displayed on the display device, a CMIS scope pattern is automatically obtained and a network management operation message corresponding to the control command is generated. In this manner, the network management operation can be efficiently performed using the scope function defined by CMIS.

According to the network management operation system of the present invention, an operator simply designates desired object instances within the network configuration screen displayed on the display device and selects a desired control command, without the need of any knowledge of the containment relationship between object instances. With this simple operation, scope parameters for the designated object instances are automatically calculated to use the CMIS scope function of OSI, and a network management operation service message including the scope parameters is generated. The management operation can be therefore executed reliably in accordance with the containment relationship between designated object instances and the selected control command.

BRIEF DESCRIPTION OF THE DRAWINGS

FIG. 8 is a diagram showing an embodiment of an icon data table providing a correspondence between the object classes of object instances and their graphic patterns, which table is used in displaying the configuration of the network shown in FIG. 2 on the display device;

FIG. 16 is a diagram showing an operation message for a single object instance;

FIG. 21 shows a parameter value storing table with initial parameter values being set when executing the scope parameter calculating algorithm;

FIG. 22 shows a parameter value storing table with intermediate parameter values being set when executing the scope parameter calculating algorithm;

FIG. 23 shows a parameter value storing table when the scope parameter calculating algorithm is completely executed;

FIG. 24 is a diagram showing a management operation message when a plurality of object instances are designated;

FIG. 33 is a diagram showing a management operation message obtained when using the filtering function.

DESCRIPTION OF THE PREFERRED EMBODIMENTS

Figure 1:
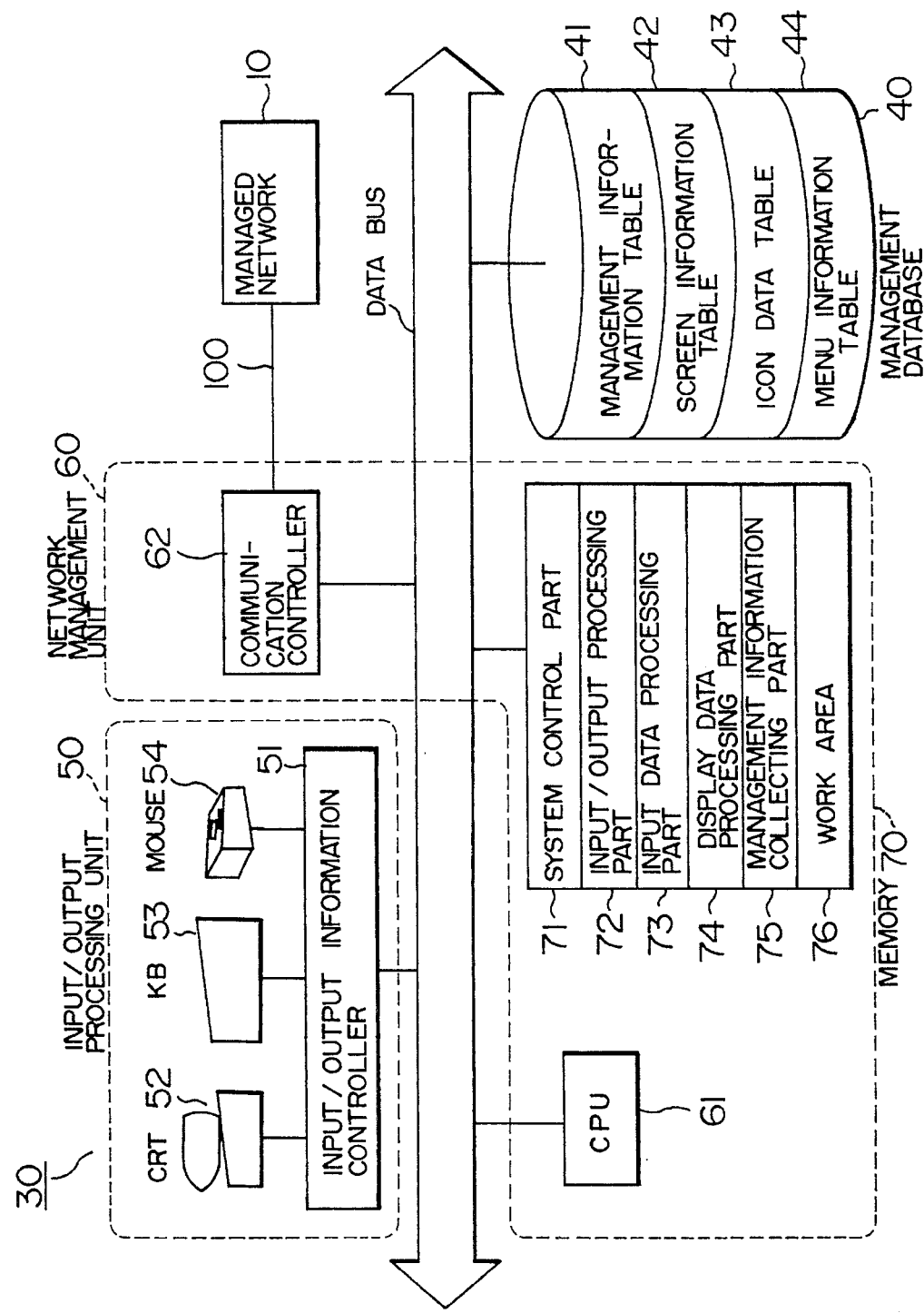
FIG. 1 is a block diagram showing the configuration of the network management operation system according to the present invention.

FIG. 1 shows the configuration of the network management operation system according to the present invention. The network management operation system 30 includes a management information database 40, an input/output processing unit 50, and a network management operation unit 60. This system 30 has a function of managing a network 10, a function of receiving an operator's control command for managing an object instance or instances, and a function of displaying the management results.

The management database 40 stores management information (in a management information table 41) of object instances constituting the network 10 to be managed, and display information (in a screen information table 42, icon data table 43, and menu information table 44) to display the management information on a CRT display device.

The input/output processing unit 50 includes a CRT display device 52 for displaying the management operation information for the network 10, a keyboard 53, a mouse 54 for selecting and entering a control command for an object instance or instances displayed on the display device, and an input/output information controller 51 which transmits information supplied from an operator to the network management unit 60 and displays information supplied from the network management unit 60 on the CRT display device 52.

The network management unit 60 includes a CPU 61, a communication controller 62 for controlling communications with the network 10, and a memory 70 for storing a variety of programs and data to be described later. Typical programs stored in the memory 70 include a system control part 71, an input/output control part 72 for controlling the input/output information from/to an operator, an input data processing part 73 for processing data inputted by an operator, a display data processing part 74 for displaying the management operation results of object instances on the CRT display device 52, and a management information collecting part 75 for collecting the management operation results of object instances. Reference numeral 76 represents a working area of the memory 70. A communication line 100 shown in FIG. 1 between the communication controller 62 of the network management unit 60 and the network 10 is usually a public communication line. Therefore, the communication efficiency of the network largely depends upon the communication efficiency of the communication line 100 itself. For the improvement of the efficiency, a CMIS scope pattern is used with the network management operation system. According to the present invention, an operator does not make a scope pattern, but simply designates an object instance or instances to be managed so that a scope pattern is automatically generated. As a result, the efficiency of the communication network can be improved without any expert knowledge of scope pattern generation.

Figure 2:
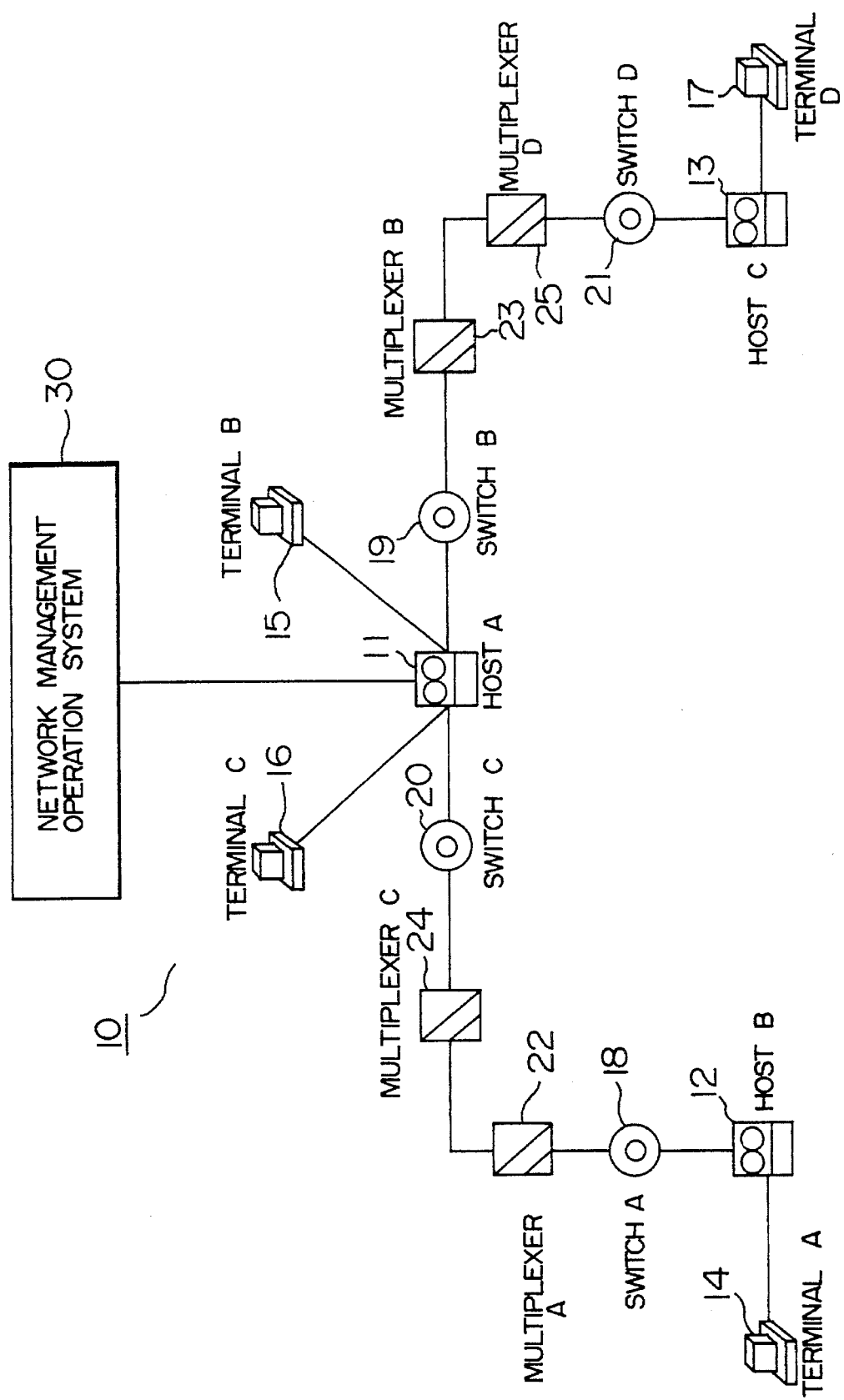
FIG. 2 is a schematic diagram showing an example of the network shown in FIG. 1.

FIG. 2 shows an example of the structure of the network 10 to be managed by the network management operation system 30 shown in FIG. 1. In this example, the network includes data processors (HOST-A, B, C) 11, 12, and 13, terminals 14 to 17 connected to the data processors, and switches 18 to 21 and multiplexers 22 to 25 interconnecting the data processors. A practical network is more complicated having a number of other object instances in addition to switches and multiplexers. In this example, the network is shown much simplified.

Figure 3:
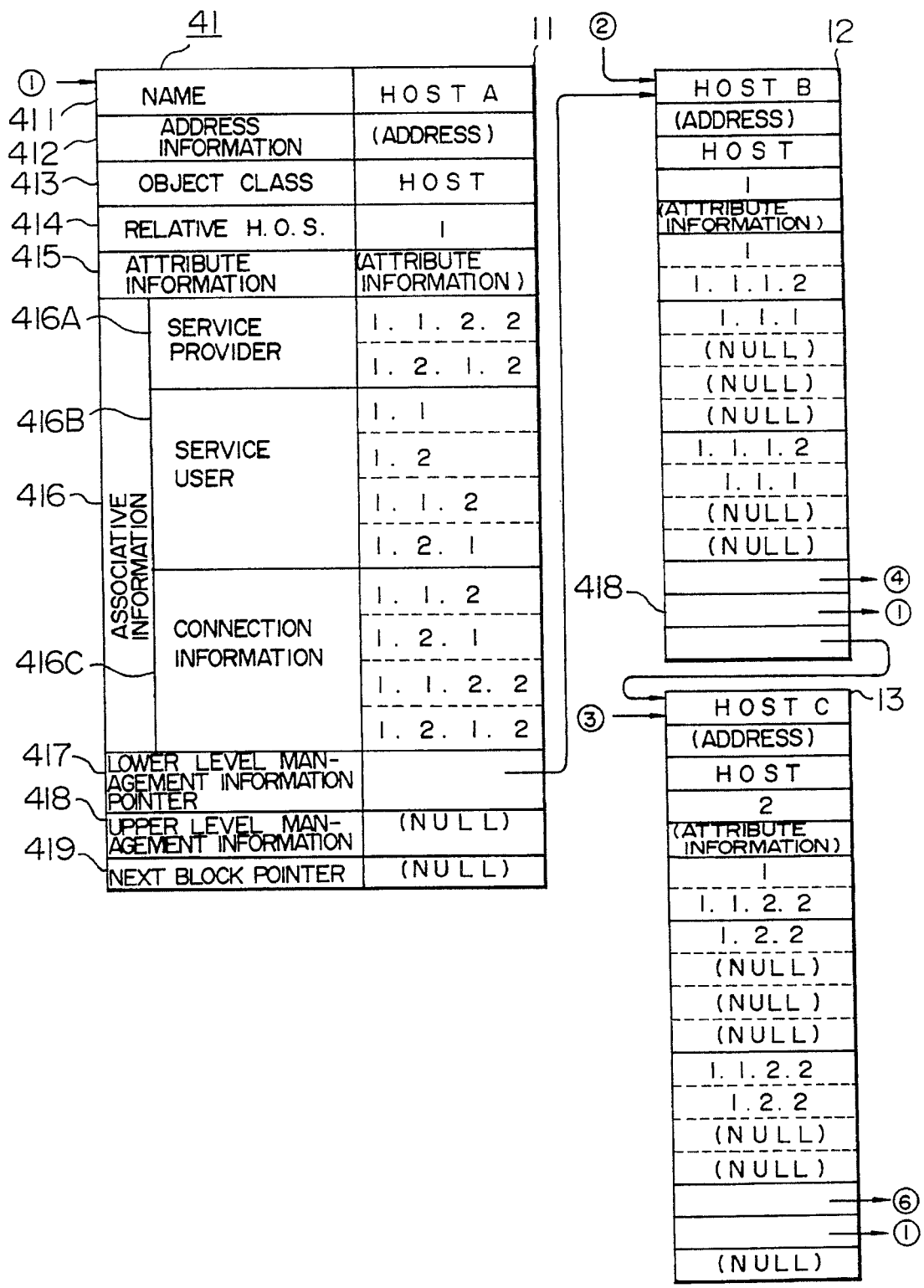
FIG. 3 is a diagram showing an embodiment of the management information table storing the management information of the network shown in FIG. 2.
Figure 4:
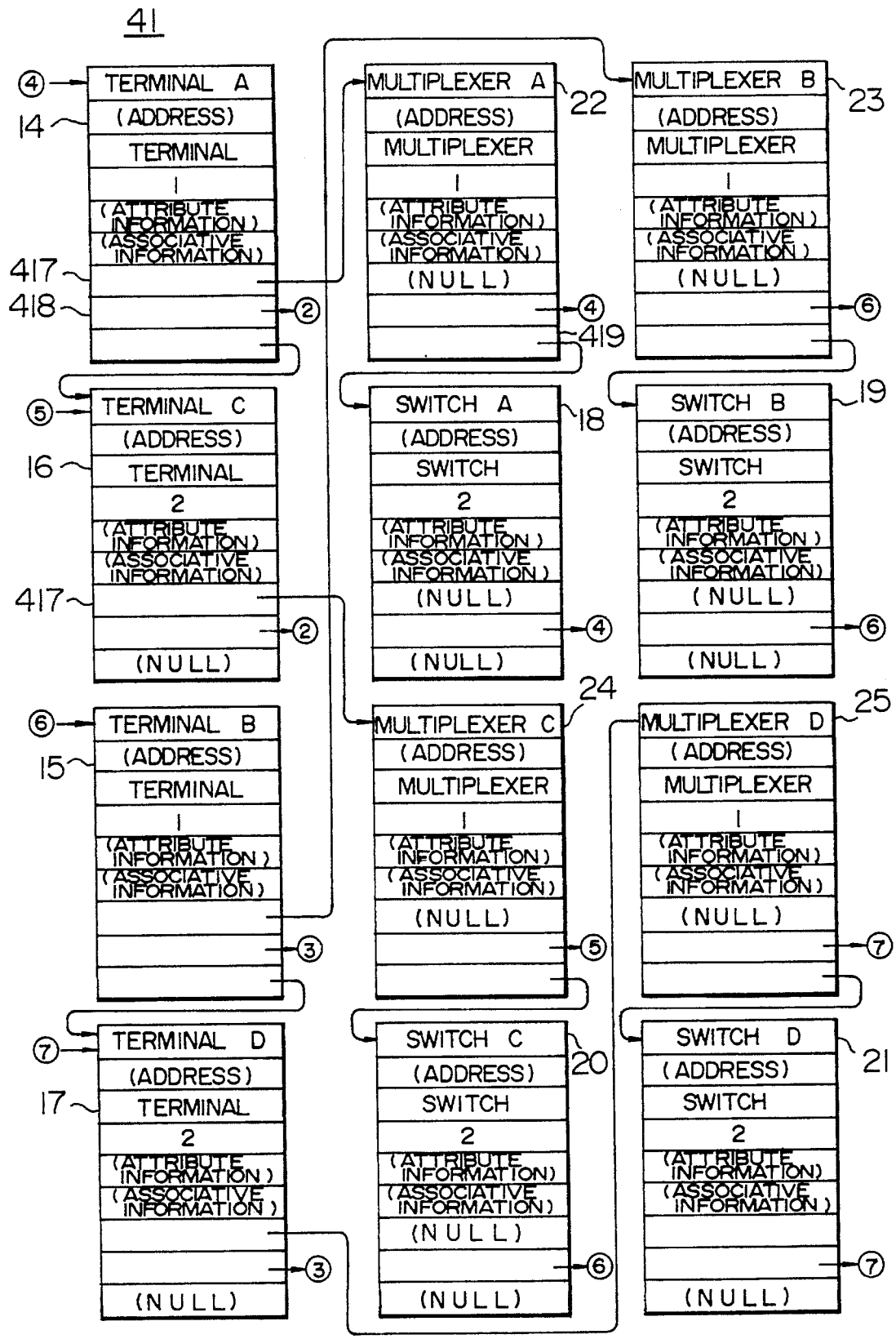
FIG. 4 is a diagram showing an embodiment of the management information table storing the management information of the network shown in FIG. 2.

FIGS. 3 and 4 show an example of the management information table 41 stored in the management information database 40. The management information table 41 includes a plurality of object instance data blocks each provided for each object instance to be managed and having the physical connection relationship between other object instances. In order to easily understand the correspondence between object instance data blocks and object instances 11 to 25 shown in FIG. 2, identical reference numerals 11 to 25 are given to the object instance data blocks shown in FIGS. 3 and 4.

Also to make the network management easy, a containment relationship between object instances are defined and stored in the management information table 1, in addition to the physical structure of the network. The containment relationship between object instances is represented by interlinking object instance data blocks by next block pointers, management information pointers, and upper level management information pointers, to be described later. Each object instance data block has the following information items:

411: Name of an object instance to be managed.

412: Address of an object instance to be managed.

413: Object class of an object instance to be managed. One object class represents a set of object instances having the same attribute information.

414: Relative Hierarchical Octet String (H.O.S.). A serial number given to each object instance in the same hierarchical level within an object instance group.

415: Attribute information.

416: Associated information including physical connection information 416C and service-related information such as a user 416B and a provider 416A.

417: Lower level management information pointer indicating lower level object instance data blocks contained by the object instance data block. If the object instance data block does not contain no lower level object instance, the lower level management information pointer 417 is set to a null.

418: Upper level management information pointer indicating the upper level object instance data block containing the object instance data block. The upper level management information pointer 418 of the object instance data block at the highest level of the tree is set to a null.

419: Next block pointer indicating the next object instance data block having the same level of the object instance data block contained by the upper level object instance. If there is no next object instance data block, the next block pointer of the object instance data block is set to a null. With this arrangement, even if a number of object instances are present at the same level, the management information table for each object instance of the same capacity can be used.

Consider, for example, the object instance 14 (terminal 14) shown in FIG. 4. The object instance has the following containment relationships (1) to (4).

(1) The lower level management information pointer 417 of the terminal 14 indicates the object instance 22 (multiplexer A), and so the containment relationship is that the object instance 14 (terminal A) contains the object instance 22 (multiplexer A). The next block pointer 419 of the object instance 22 (multiplexer A) indicates the object instance 18 (switch A), and so the containment relationship is that the object instance 18 (switch A) is contained by the object instance 14 (terminal A).

(2) Similarly, the object instance 16 (terminal C) contains the object instance 24 (multiplexer C) and object instance 20 (switch C).

(3) The upper level management information pointer 4128 of the object instance 14 (terminal A) indicates the object instance (HOST-B) shown in FIG. 4, and so the object instance 14 (terminal A) is contained by the object instance 12 (HOST-B). The next block pointer 419 of the object instance 14 (terminal A) indicates the object instance 16 (terminal C), and so the object instance 16 (terminal C) is contained by the object instance (HOST-B).

(4) The upper level management information pointer 418 of the object instance 12 (HOST-B) indicates the object instance 11 (HOST-A), and so the object instance 12 (HOST-B) is contained by the object instance 11 (HOST-A).

The containment relationship between the object instances 11 (HOST-A), 12 (HOST-B), 14 (terminal A), 16 (terminal C), 18 (switch A), 20 (switch C), 22 (multiplexer A), and 24 (multiplexer C) shown in FIG. 2, is therefore expressed in the hierarchical structure shown below, by retrieving information from the management information tables shown in FIGS. 3 and 4.

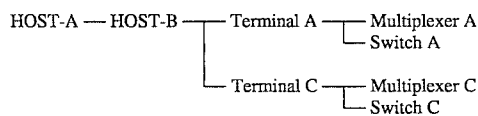

Figure 5:
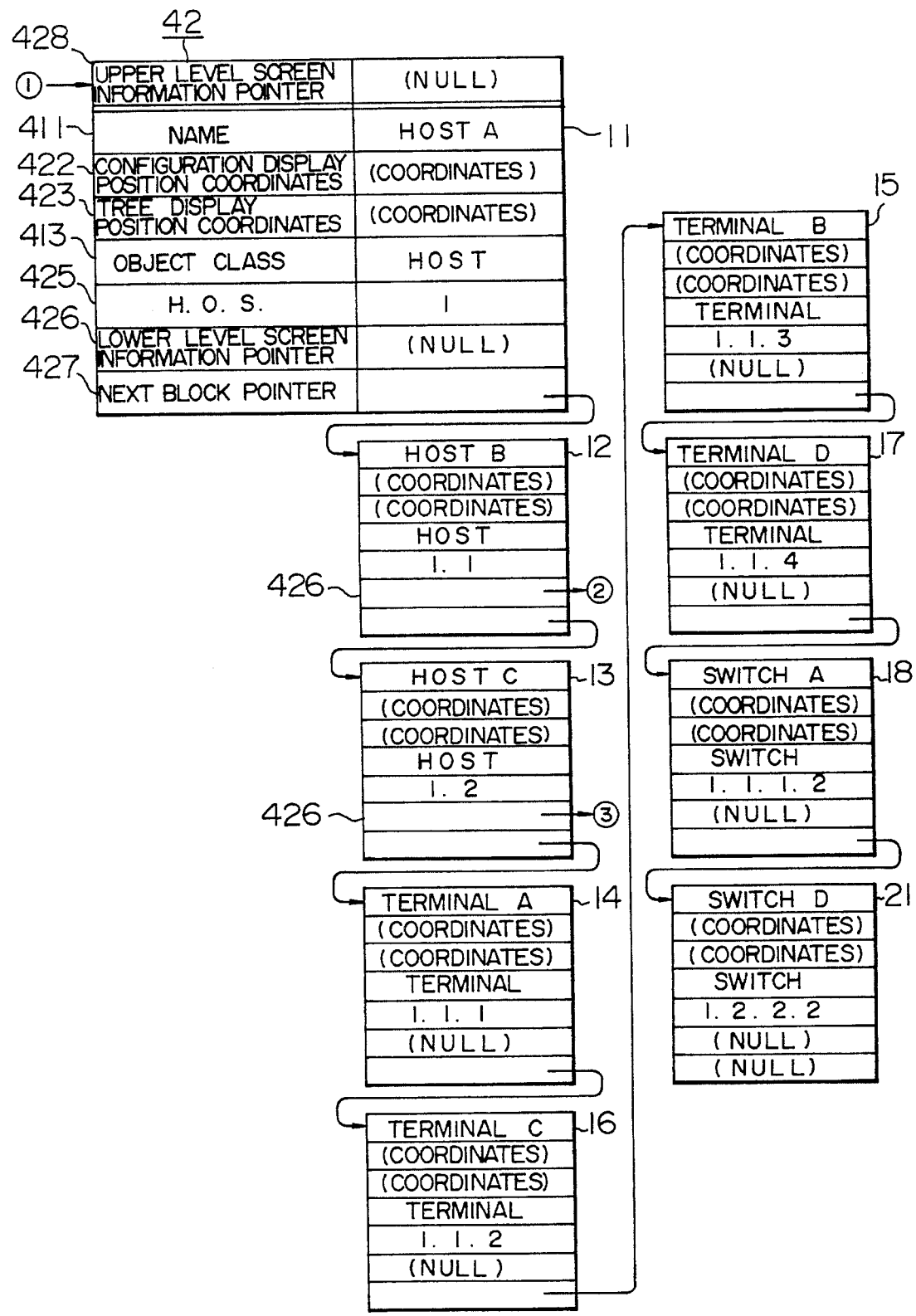
FIG. 5 is a diagram showing an embodiment of a first part of the screen information table storing screen information for displaying the configuration of the network shown in FIG. 2.
Figure 6:
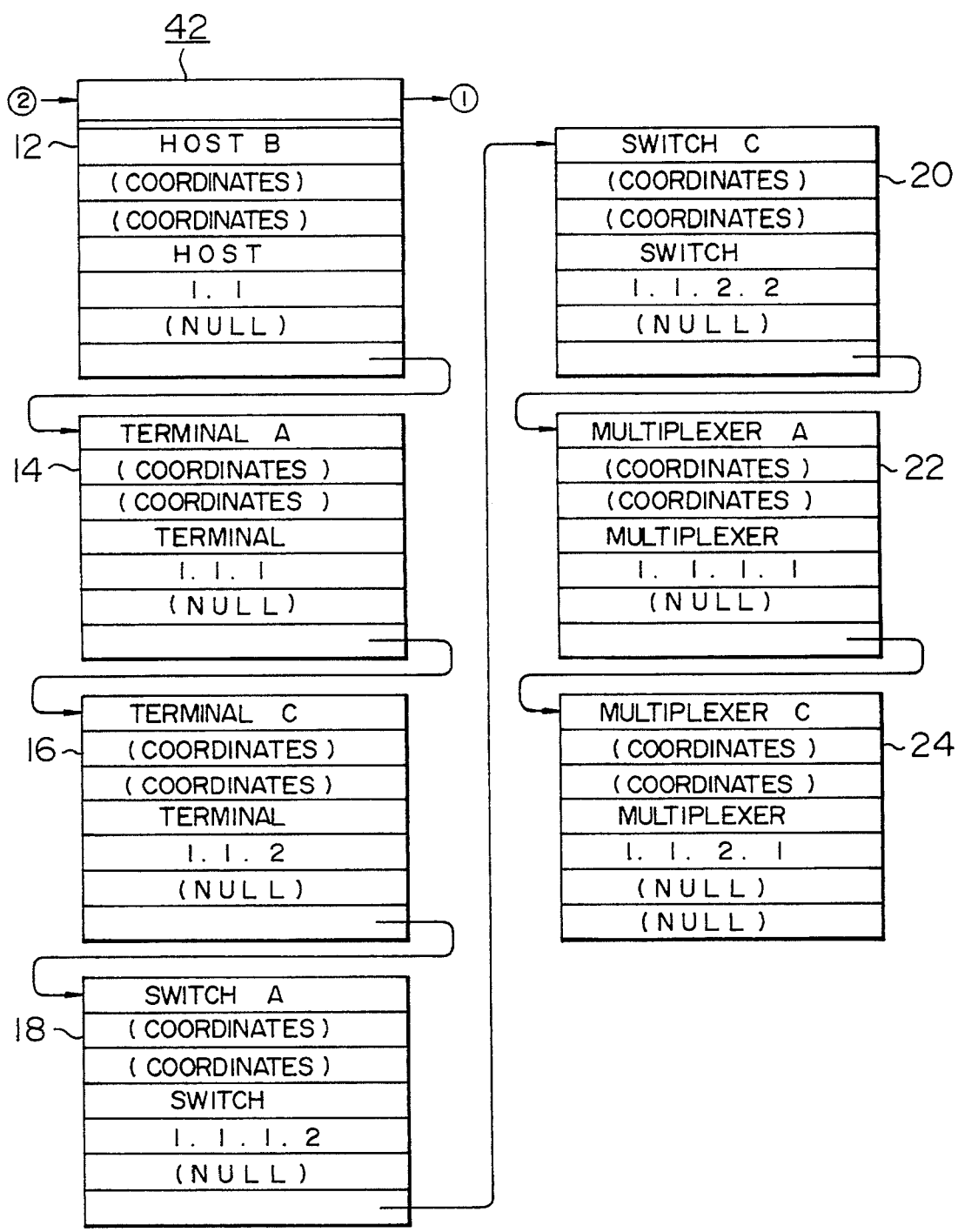
FIG. 6 is a diagram showing an embodiment of a second part of the screen information table storing screen information for displaying the configuration of the network shown in FIG. 2.
Figure 7:
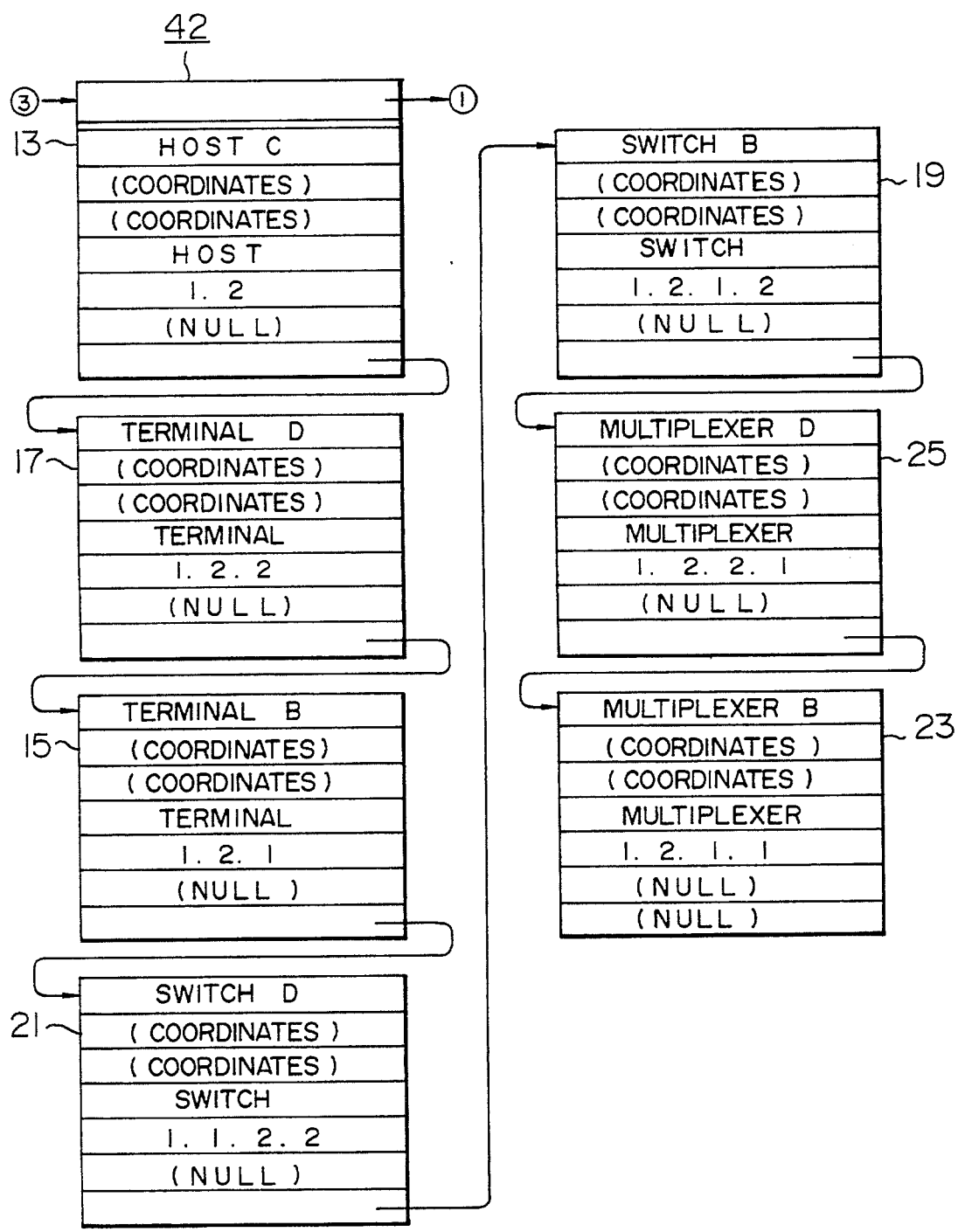
FIG. 7 is a diagram showing an embodiment of a third part of the screen information table storing screen information for displaying the configuration of the network shown in FIG. 2.

FIGS. 5 to 7 show the structure of the screen information table 42 storing screen information to be displayed on the CRT display device 52 of the input/output processing unit 50. The screen information of the present invention includes the configuration information of the network 10 to be managed, and a tree configuration to be used for designating object instances for the management operation. In order to display such information, a plurality of screen display element blocks corresponding to each of the plurality of object instances are stored in the screen information table 42, the blocks being interlinked by next block pointers.

One interlinked structure defines one configuration information screen. Some of screen display element blocks of the interlinked structure may indicate the top screen display element block of another interlinked structure, by using one of the block information item, a lower level screen information pointer 426 which defines the lower level configuration screen information. With this arrangement, as will be later described, if the lower level screen information pointer 426 of the screen display element identified by an operator indicates one of the lower screen level display element blocks, the lower level configuration screen information related to the indicated element block can be displayed on the CRT display device. Each screen display element block has the following information items:

411: Name of an object instance to be managed.

422: Display coordinates on the configuration information screen of the CRT display device 52.

423: Display coordinates on the tree information screen of the CRT display device 52.

414: Object class of an object instance to be managed. One object class represents a set of object instances having the same attribute information.

425: H.O.S. A serial number of relative H.O.S sequentially given to each object instance starting from the object instance with the highest level of the containment relationship.

426: Lower screen information pointer. If there is no lower level configuration screen information, the lower screen information pointer is set to a null.

427: Next block pointer interlinking the next screen display element block in the same screen information block. If there is no next screen display element block, the next block pointer 427 is set to a null.

428: Upper screen information pointer provided for each screen information block and indicating one a configuration display element of the upper level configuration information screen. The upper screen information pointer 428 of the highest level configuration information screen is set to a null.

The screen display element blocks shown in FIGS. 5 to 7 are represented by the identical reference numerals 11 to 25 of the corresponding object instances shown in FIG. 2. In this example, nine screen display element blocks 11 to 18 and 21 interlinked by the next block pointers shown in FIG. 5 define one configuration information screen. The lower level screen information pointer (2) of the screen display element block 12 indicates and allows to call the configuration information screen defined by the screen display element blocks 12 to 24 shown in FIG. 6, and the lower level screen information pointer (3) of the screen display element block 13 indicates and allows to call the configuration information screen defined by the screen display element blocks 13 to 25 shown in FIG. 7.

FIG. 8 shows the structure of the icon data table 43 in the management information database 40. The icon data table 43 stores the object class 413 of each display element to be displayed on the CRT device and the corresponding icon data 431.

Figure 9:
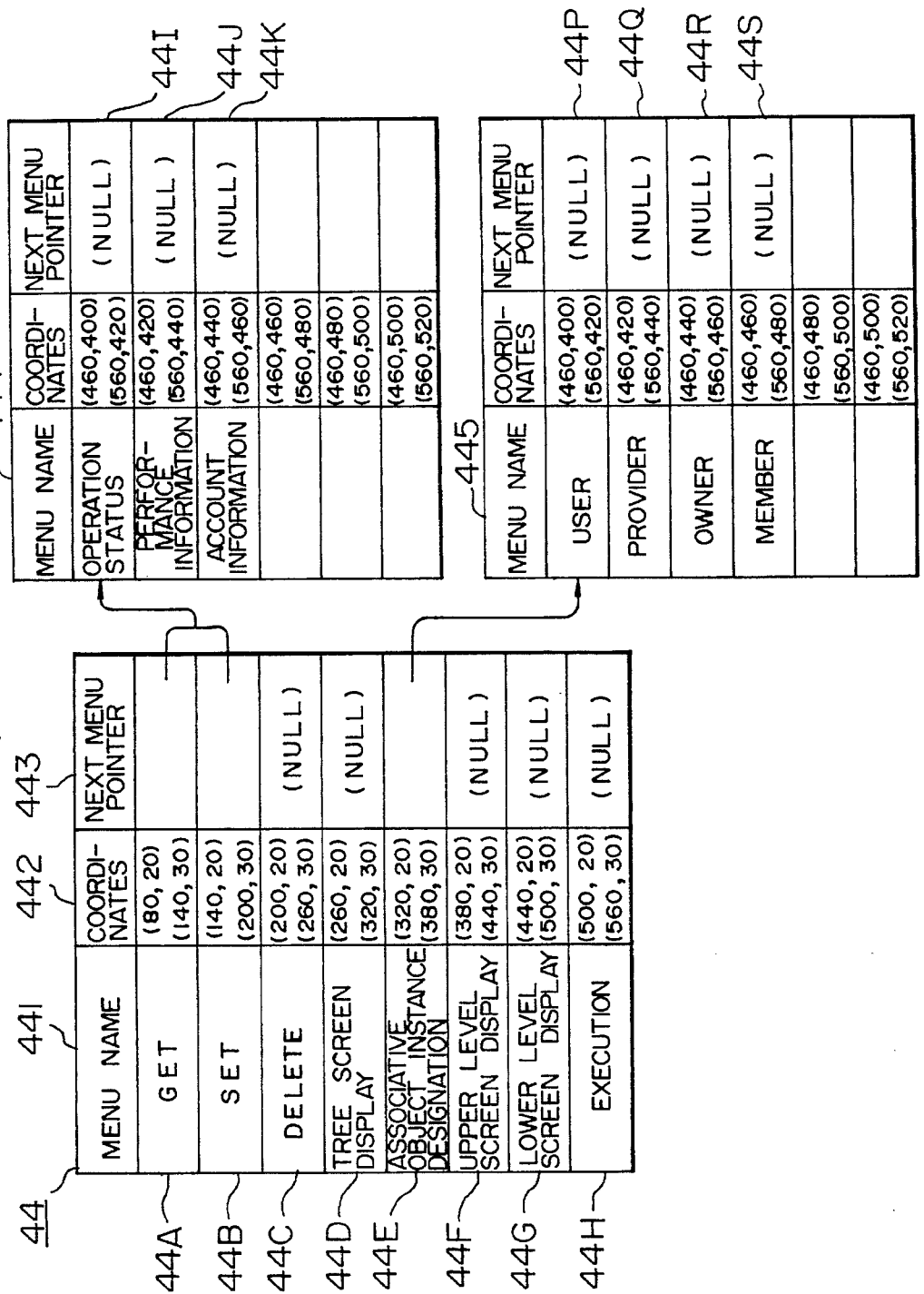
FIG. 9 is a diagram showing an embodiment of a menu information table storing information to be displayed on the display device in the operation menu screen, for selecting a control command.

FIG. 9 shows the structure of the menu information table 44 in the management information database 40. The menu information table 44 includes a plurality of records 44A to 44S corresponding to the types of menus. Each menu includes the name 441 of a menu for the management operation, coordinates 442 of the menu on the display screen, and a pointer indicating a menu to be next displayed. A menu item on the display screen designated by an operator with a mouse can be identified using menu information tables 44, 444, and 445 shown in FIG. 9.

Next, the management operation for an object instance or instances designated by an operator (not shown) and the display of the management results will be described as an example showing the function of the network management operation system of the present invention. The procedure of the management operation of the present invention is shown in the flow chart of FIG. 10.

Figure 10:
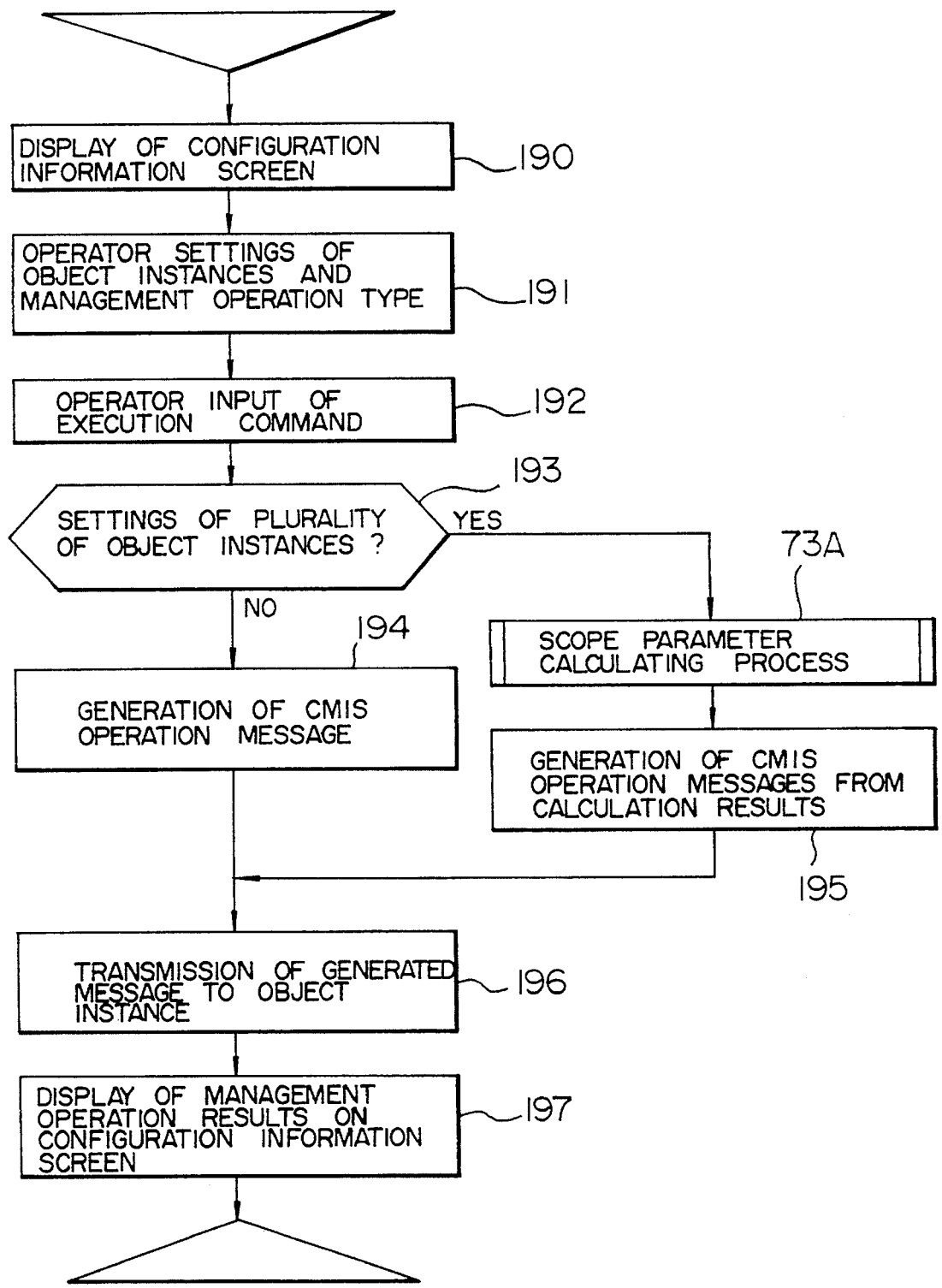
FIG. 10 is a flow chart explaining the operation of the network management operation system according to the present invention.
Figure 11:
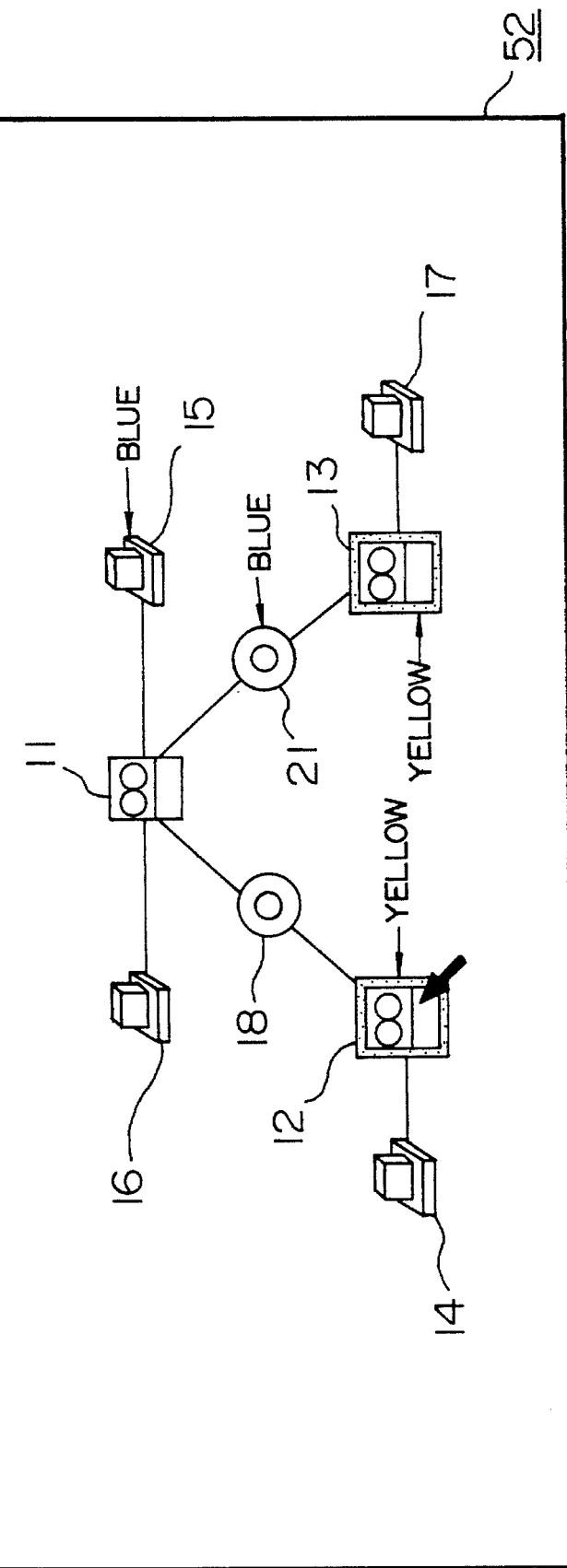
FIG. 11 is a diagram showing the highest level configuration information screen of the configuration of the network.

FIG. 11 shows the configuration information screen of the network 10 displayed on the CRT display device 52 at Step 190 shown in FIG. 10. This screen can be generated in the following manner. The icon data 431 corresponding to the object class 413 of each screen display element block (each of the blocks 11 to 18, and 21 shown in FIG. 5) of the highest level configuration information screen stored in the image information table 42 is first obtained from the icon data table 43 shown in FIG. 8, and displayed at the screen position designated by the configuration display position coordinates 422.

In order to help an operator easily determine whether the lower configuration information screen can be displayed, the object instance having the lower level screen information pointer 426 which is not a null (e.g., object instances 12 and 13) is visually distinguishably displayed, for example, the peripheral portion of such object instances are colored yellow as shown in FIG. 11.

A menu generated by the menu information table 44 shown in FIG. 9 is displayed at the upper area of the configuration information screen. The menu items include the control commands identifying the type of management operation such as "GET" 44A, "SET" 44B, and "DELETE" 44C, commands 44D to 44G for designating the switching between display screens, and an execution command 44H.

An operator designates the object instance and the type of management operation displayed within the configuration information screen (Step 191 in FIG. 10). For example, when an operator clicks the mouse 54 on the display element with the yellow colored periphery indicating the availability of the lower level configuration information screen, and again clicks the mouse 54 on the "lower level screen display" command 44G of the management operation menu, then a set of screen information blocks interlinked by the lower level screen information pointer 426 and stored in the screen information table 42 are read and the lower level configuration information screen defined by these screen information blocks is replaced by the highest level configuration information screen and displayed on the CRT display device 52.

Figure 12:
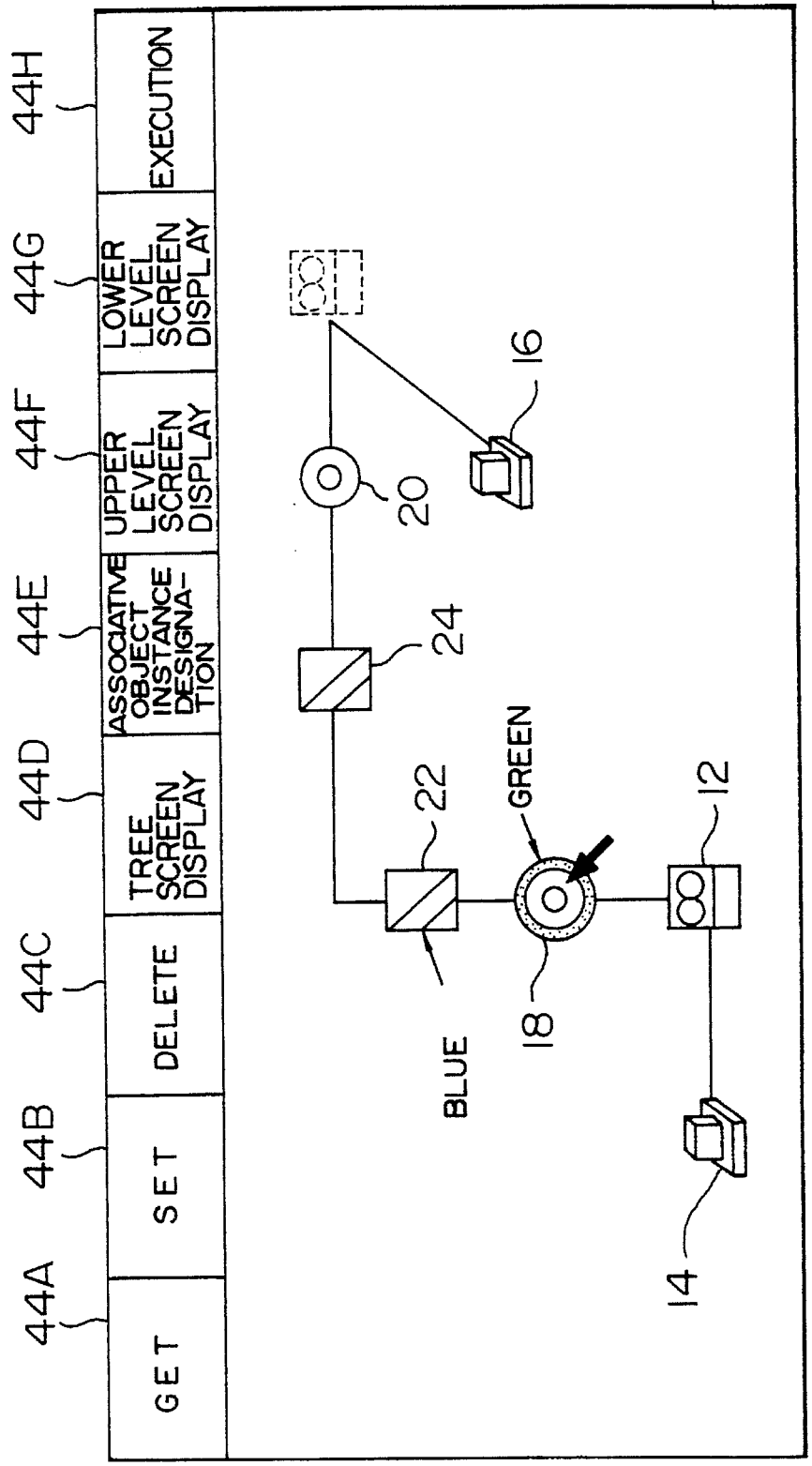
FIG. 12 is a diagram showing an embodiment of the configuration information screen of the configuration of the network, with an object instance being identified.

FIG. 12 shows an example of the lower level configuration information screen displayed upon the designation of the display element 12 (HOST-B) shown in FIG. 11.

When an operator intends to preform the management operation for an object instance, while looking at the configuration information screen on the CRT display device, the operator first clicks (Step 191) the mouse 54 on the display element of the object instance for which the management operation is to be executed. If the object instance for the management operation is a lower level object instance of the presently displayed highest level configuration information screen, the display element with the yellow colored periphery considered as having the lower level object instance which may be the object instance the operator intends, is designated to call the lower level configuration information screen. The object instance for which the management control is executed is then selected from the displayed lower level configuration information screen.

In order to help an operator easily discriminate between the display element of the object instance, which the operator designated and for which the management control is to be executed, and other display elements not designated by the operator, respectively in the configuration information screen, the designated display element of the object instance for the management operation is visually distinguishably displayed, for example, the peripheral area of the display element is colored green. The display element 16 (switch A) in the configuration information screen shown in FIG. 11 is the designated display element of the object instance for the management operation.

An operator may designate a plurality of object instances for which the same type of management operation is executed, in the same manner described above.

Figure 13:
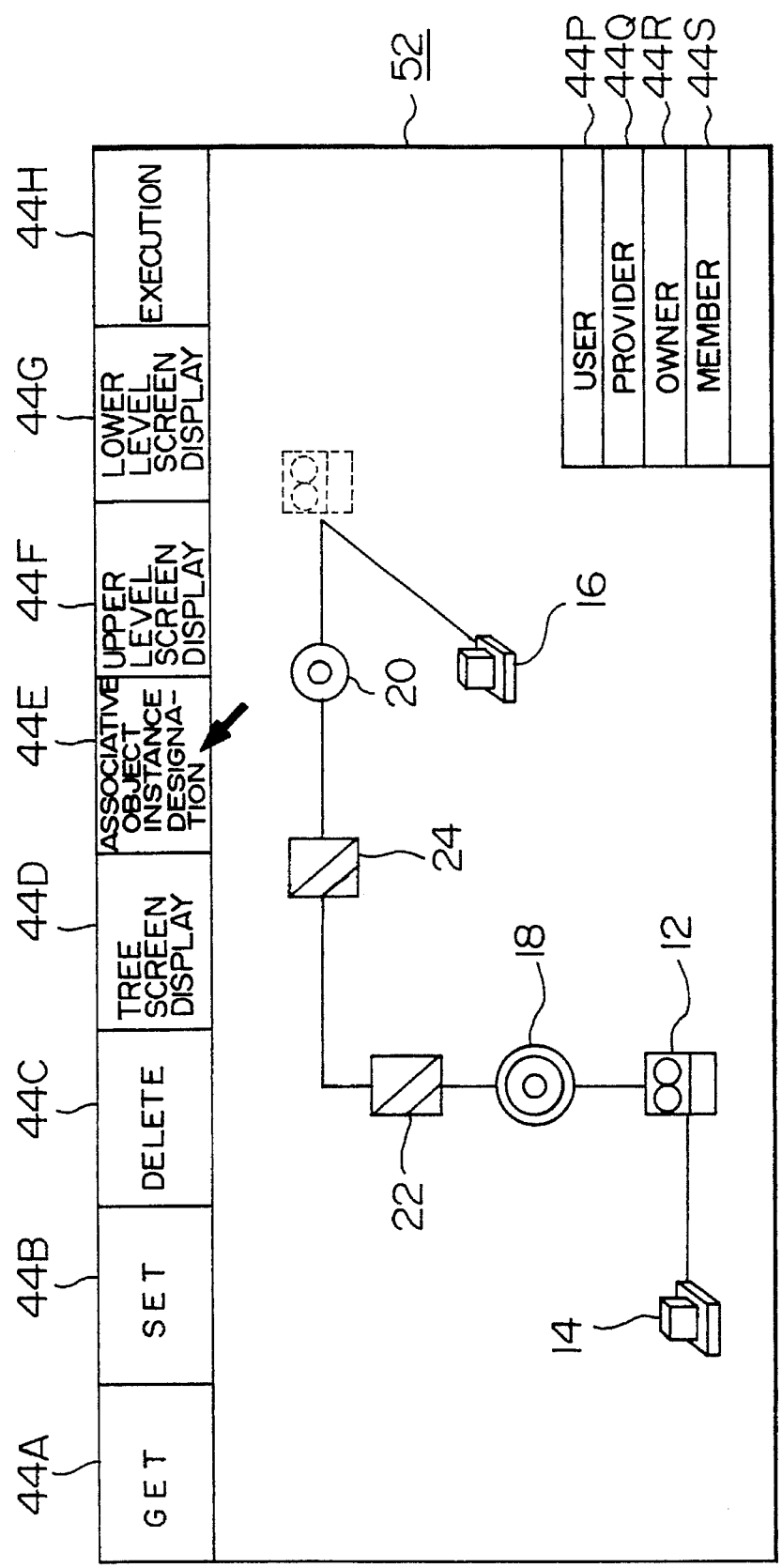
FIG. 13 is a diagram showing an embodiment of the configuration information screen, with the associative information of the identified object instance being displayed.

In designating a plurality of object instances for the same type of management operation, there may occur the case where the same management operation is to be executed for other object instances having a certain attribute (such as "service user" and "service provider") same as the designated object instances. In this case, an operator first designates object instances in the manner described above, and then the "associated object instance designation" command 44E in the menu at the upper area of the configuration information screen is clicked with the mouse. When this command is clicked, the contents of the menu information table 445 interlinked by the next menu pointer of the menu information table 44 are read and displayed on the configuration information screen, for example, several attributes 44P to 44S as shown in FIG. 13.

When the operator designates the attribute, other object instances different from the first designated original object instances but having the same designated attribute are retrieved while referring to the associative information 416 of the management information table 41. Both the original object instances and retrieved object instances are displayed as designated object instances, visually distinguishably from other object instances not designated.

After having designated the display elements of the object instances on the configuration information screen, the operator may change the designated object instances, from the viewpoint of efficiency of the network management operation, in accordance with the containment relationship while displaying the tree structure on the CRT display device 52.

If the operator clicks the mouse on the "tree screen display" command of the menu displayed on the configuration information screen, the containment relationship between object instances is displayed as the tree structure screen on the CRT display device 52.

Figure 14:
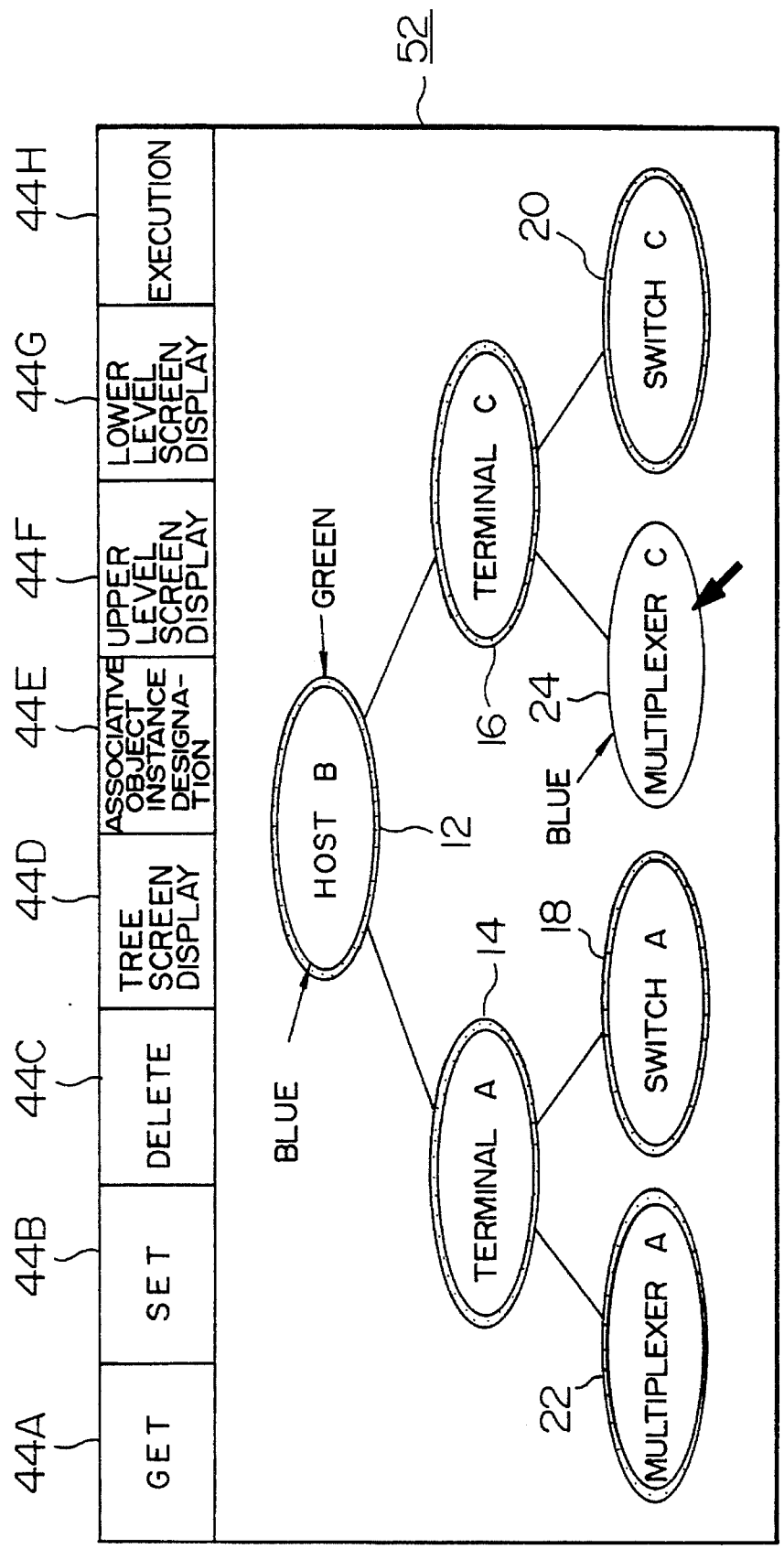
FIG. 14 is a diagram showing an embodiment of a tree structure with an object instance being designated.

FIG. 14 shows an example of the tree structure. This tree structure is obtained by displaying the display elements (shown as ellipsoids in FIG. 14) at positions designated by the tree display position coordinates 423 in the screen information table 42. In this case, the tree display elements corresponding to the already designated display elements prior to displaying the tree structure are visually distinguishably displayed, for example, the peripheral areas of the already designated display elements (such as the display element 12 shown in FIG. 12) are colored green.

When the operator clicks the mouse 54 on a display element other than the already designated display elements on the tree screen, the object instance corresponding to the clicked display element is entered as one of the already designated object instances. This clicked display element is also visually distinguishably displayed. The operator may either add a new object instance as the designated object instance or delete the already designated object instance, by using the mouse. In this manner, the object instances can be changed in a precise and fine manner like an experienced operator, by referring to the tree structure screen.

Figure 15:
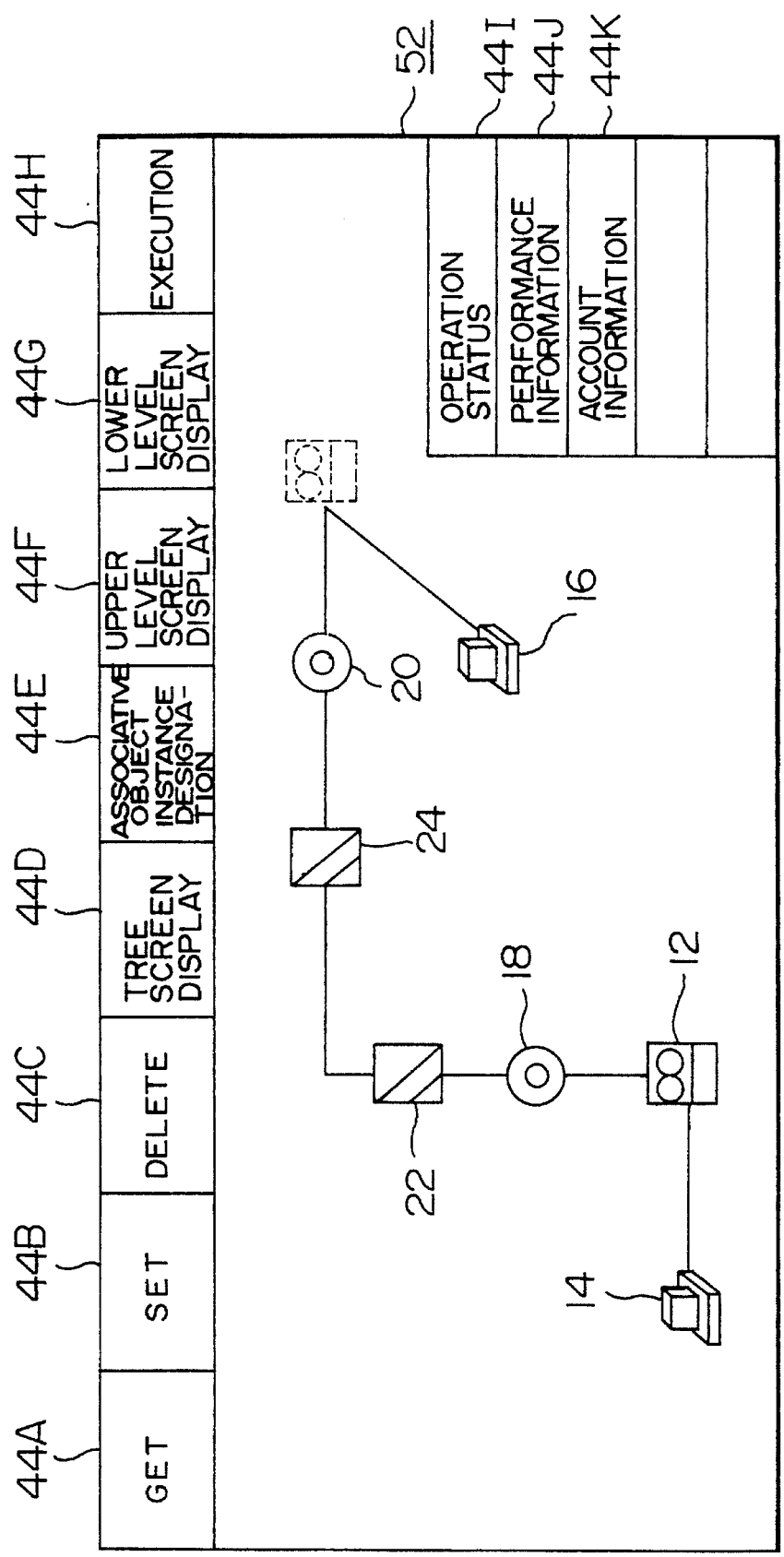
FIG. 15 is a diagram showing an embodiment of the configuration information screen for setting the detailed information for the management operation.
Figure 17:
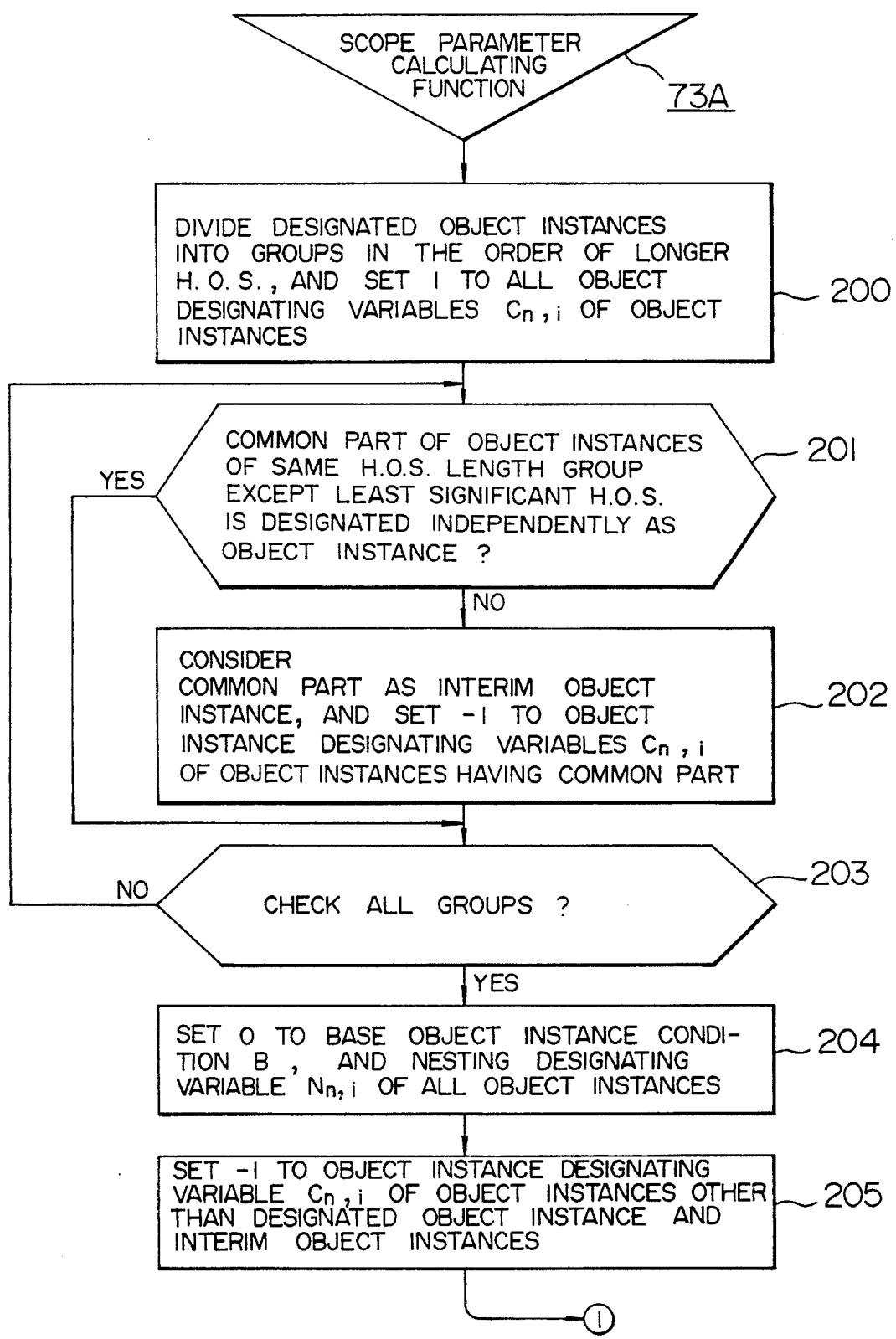
FIG. 17 is a flow chart showing an embodiment of a scope parameter calculating algorithm.
Figure 18:
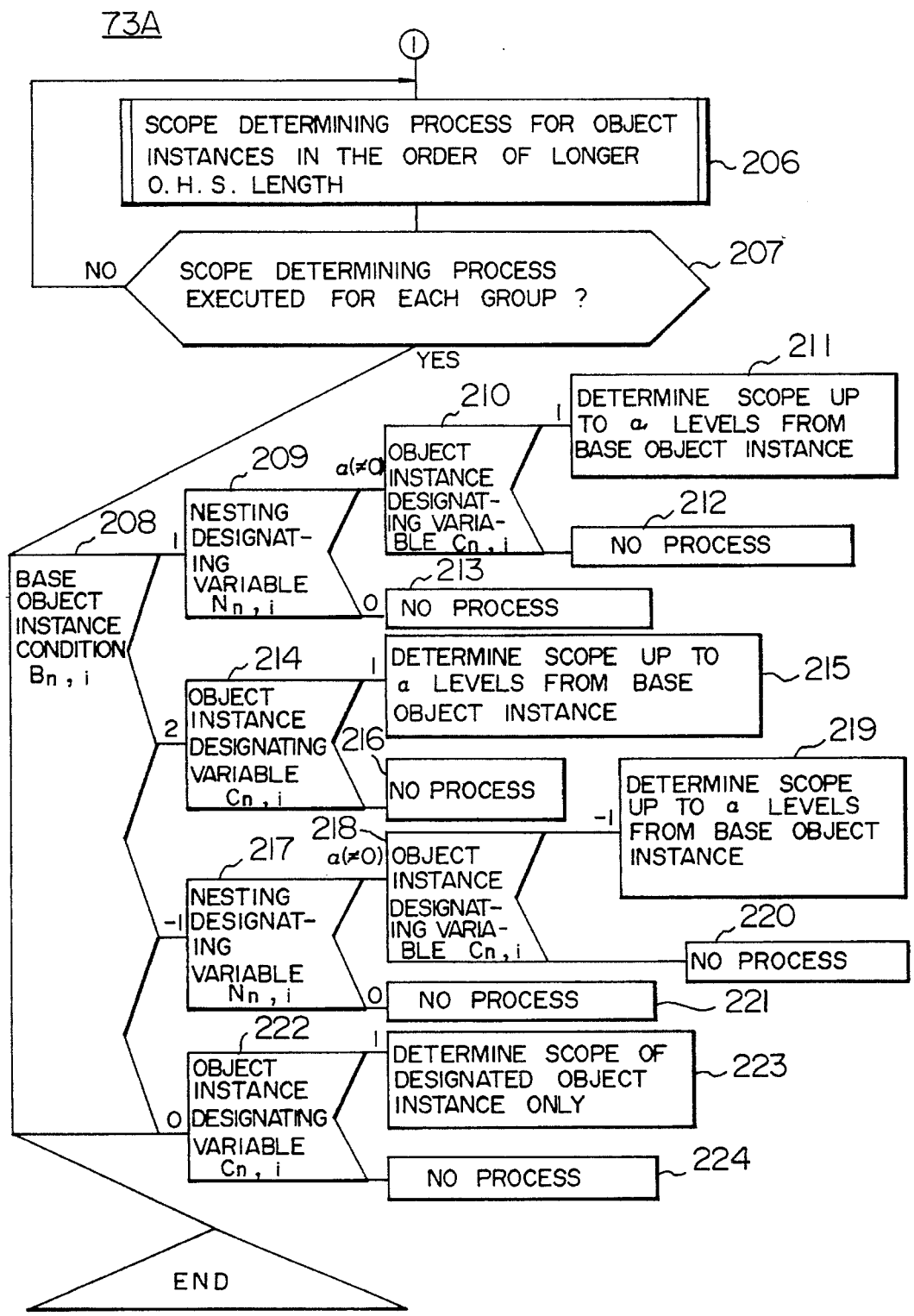
FIG. 18 is a flow chart showing an embodiment of a scope parameter calculating algorithm.
Figure 19:
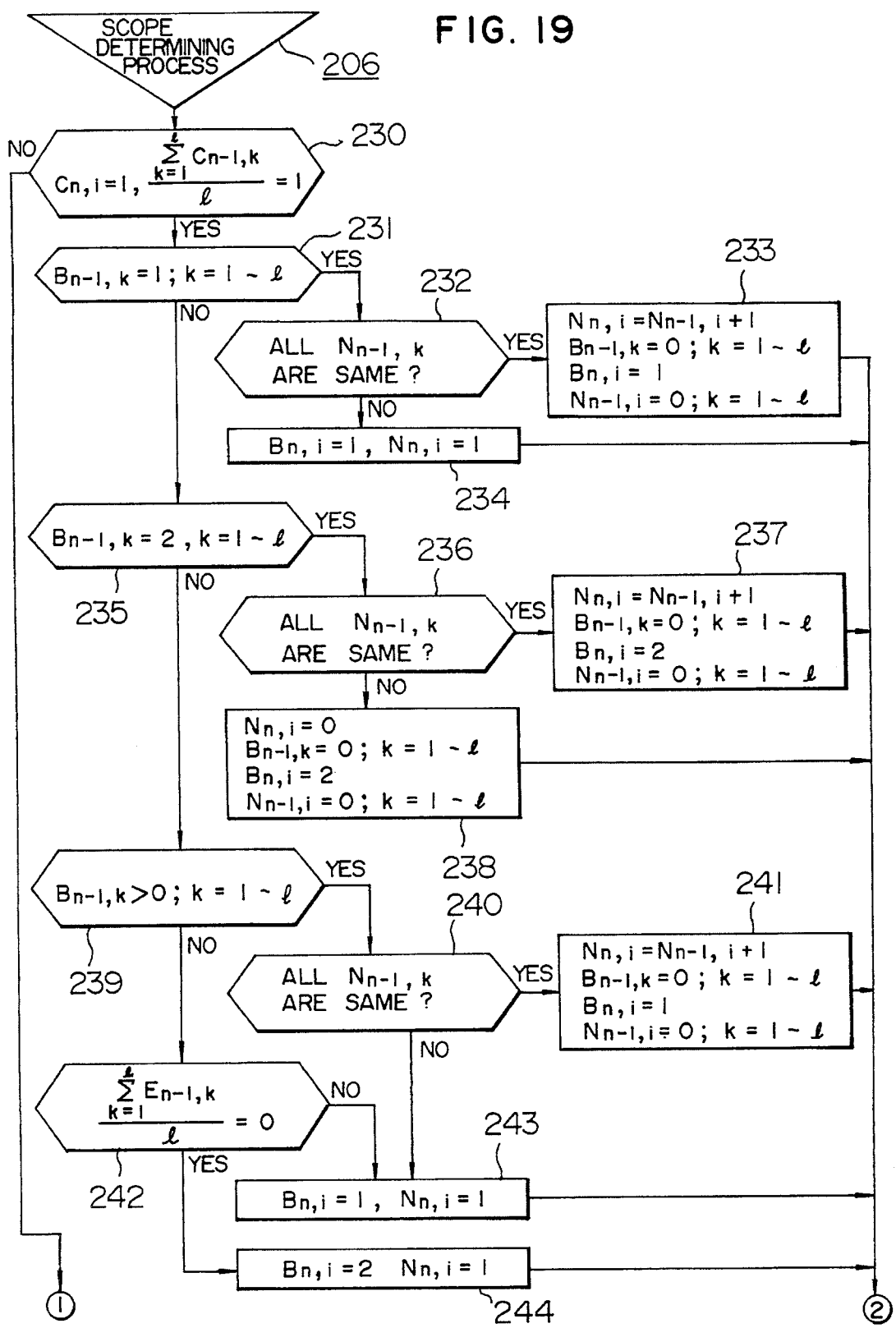
FIG. 19 is a diagram showing a first part of the flow chart for the scope determining process.
Figure 20:
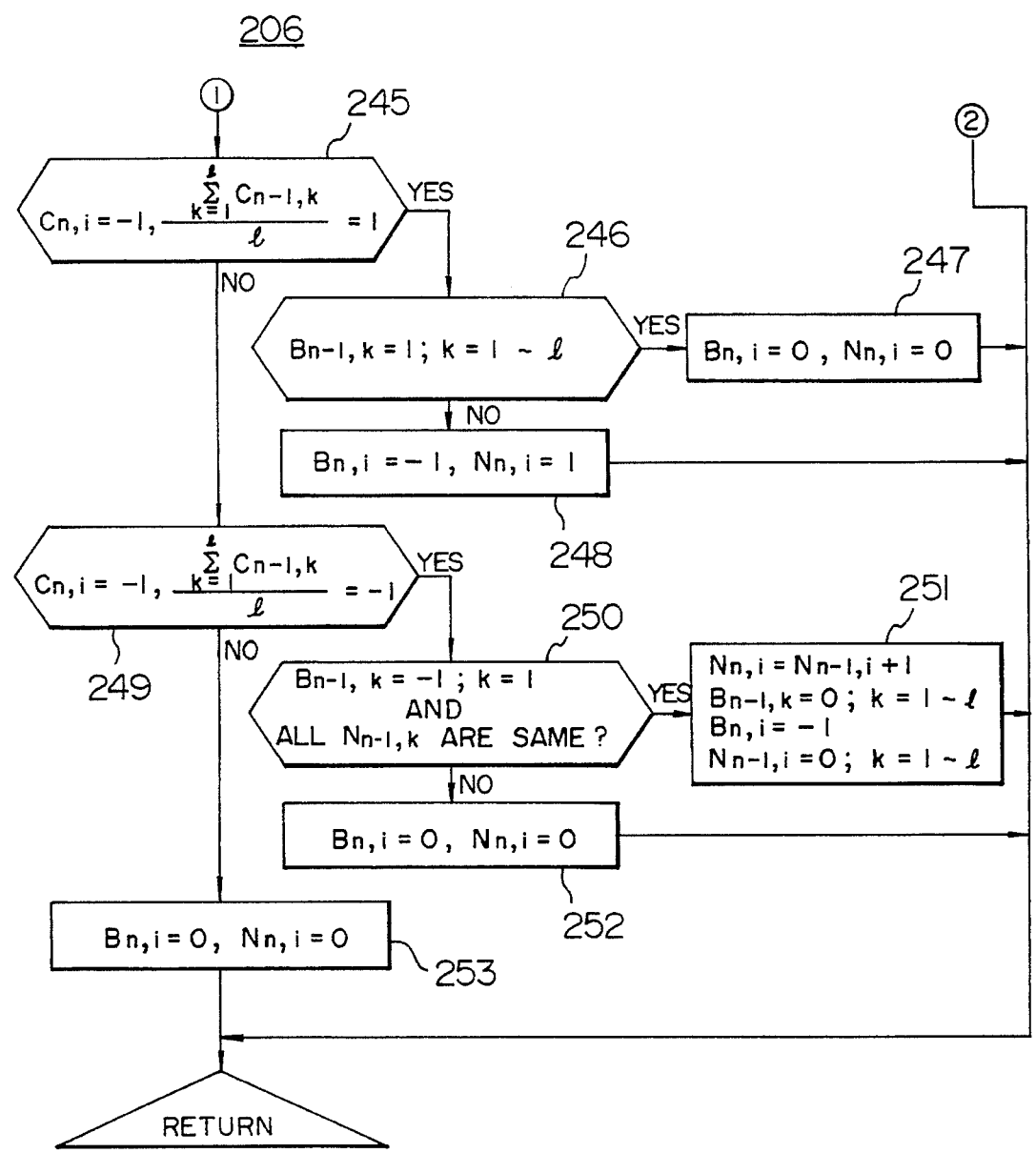
FIG. 20 is a diagram showing a second part of the flow chart for the scope determining process.

After the object instances have been designated definitely, the operator selects one of the commands 44A to 44c (GET, SET, DELETE) of the menu to be executed by using the mouse 54. If the detailed information is required to be set for the selected type of management operation, a detailed information request screen is displayed. For example, if the GET or SET management operation is selected, menu information table 444 interlinked by the next menu pointer 443 of the menu information table 44 is read and displayed on the configuration information screen 52 (44I to 44K in FIG. 15).

After setting all management operation information, the operator designates the "execute" command 44H (Step 192 in FIG. 10).

The input/output information controller transmits the information set by an operator to CPU 61 which generates a CMIS operation message using the input data processing part program 73 in the memory 70. The following process branches either to a process for a single designated object instance, or a process for a plurality of designated object instances (Step 193).

For a single designated object instance, the CMIS operation message is generated in accordance with the designated object instance, type of management operation, and related detailed information (Step 194). Suppose that the switch A18 only was designated on the configuration information screen as the object instance, the operation message is generated in the format shown in FIG. 16. In this example, H.O.S. of the switch A 18 is set for the object instance 101 in this operation message 100.

For a plurality of designated object instances, it is checked by using a scope parameter calculating program in the input data processing part whether the object instances designated by an operator form a partial tree. If the partial tree is being formed, scope parameters (a base object instance of the partial tree, and a number of hierarchical levels from the base object instance) are calculated.

In the scope parameter calculating algorithm, the following parameters are defined:

(1) Object instance designating variable $C_{n,i}$: A variable indicating whether node i at the hierarchical level n of the containment tree is being designated.

$$C_{n,i} = \begin{array}{l} 1 \ldots \text{ object instance designated} \\ -1 \ldots \text{ object instance not designated} \end{array} \quad (1)$$

(2) Object instance end condition $E_{n,i}$: A variable indicating whether the object instance at node i at the hierarchical level n is the lowest level object instance (not containing the lower object instance).

$$E_{n,i} = \begin{array}{l} 1 \ldots \text{ intermediate object instance} \\ 0 \ldots \text{ lowest object instance} \end{array} \quad (2)$$

(3) Base object instance condition $B_{n,i}$: A variable indicating whether the object instance at node i at the hierarchical level n satisfies the condition of the base object instance.

$$B_{n,i} = \begin{array}{ll} 0 \ldots & \text{invalid base object instance} \\ 1 \ldots & \text{all object instances from} \\ & \text{base object intance to} \\ & \text{n-level lower object instance} \\ 2 \ldots & \text{base object instance and} \\ & \text{all lower level object instances} \\ -1 \ldots & \text{object instance n-level lower} \\ & \text{than base object instance} \end{array} \quad (3)$$

(4) Scope depth designating variable $N_{n,i}$: A variable indicating the scope depth number when the object instance at node i at the hierarchical level n satisfies the condition of the base object instance.

$$N_{n,i} = \alpha \text{ (nesting number)} \quad (4)$$

The algorithm of the scope parameter calculating program is shown in FIGS. 17 to 20.

First, initial value setting parts 200 to 205 of the scope parameter calculating algorithm set initial values of object instances to a parameter value storage table 73B as shown in FIG. 21. Next, a scope determining program 206 is executed for the node group having the longest H.O.S. so that the parameter values in the parameter value storage table change as shown in FIG. 22. This process is executed for all node groups down to the shortest H.O.S. so that the parameter values shown in FIG. 23 are obtained.

After the execution of the scope parameter calculating program, the CMIS operation message having the format such as shown in FIG. 24 is obtained, in accordance with the program execution results (base object instance, scope type, and scope depth) and information set by the operator (management operation type, and related detailed information) (Step 195 of FIG. 10).

The generated CMIS operation message or messages for a single object instance or a plurality of object instances are transmitted from the communication controller 62 to the object instance or instances of the network 10 (Step 196).

Figure 25:
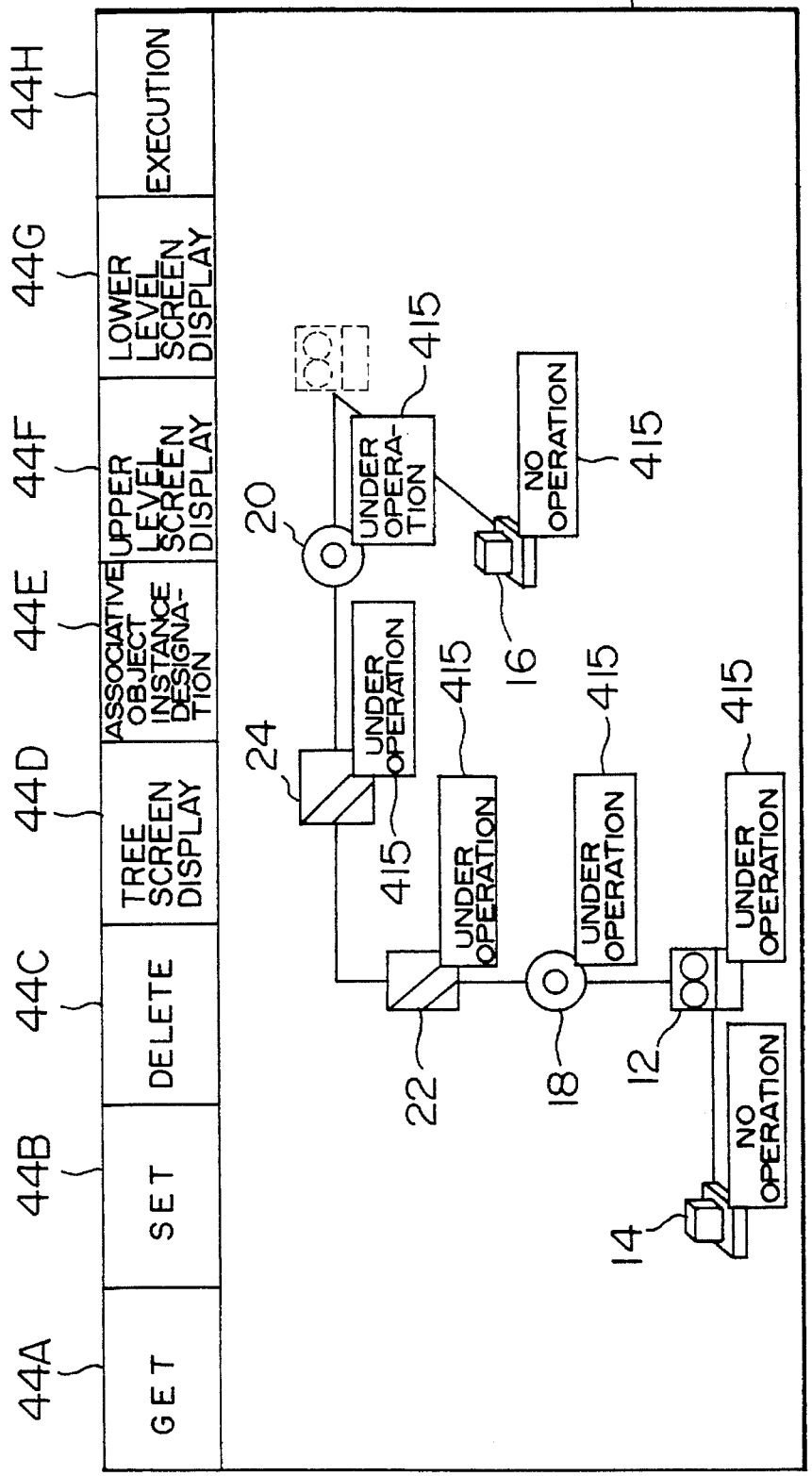
FIG. 25 is a diagram showing an embodiment of a representation of the network management operation results on the display screen.

If the management operation results in that information to be supplied to the operator is necessary, such information is displayed, for example, at the side of each display element of the object instance on the configuration information screen as shown in FIG. 25 (Step 197).

In the above way, an operator for the network management operation system can efficiently perform the management operation of the object instance designated by the operator, by using the CMIS scope function of OSI. Furthermore, use of associative information allows the operator to reduce the burden of designating a plurality of object instances having the same attribute.

Next, another network management operation system having a plurality of input/output processing units according to the second embodiment of the present invention will be described, wherein the management operations belonging to the same type management operation control command from the input/output processing units are collectively performed. The same type management operation control command means the same settings of the operation type ("GET", "SET", and etc.) "DELETE") and related detailed information ("Operation status", "Performance information", and etc.)

Even if a plurality of input/output processing units are operating independently, the use efficiency of the communication line 100 can be improved if the scope pattern is generated collectively for the same control commands issued from a plurality of input/output processing units and sent to the network to be managed. The second embodiment has been proposed to achieve this object.

Figure 26:
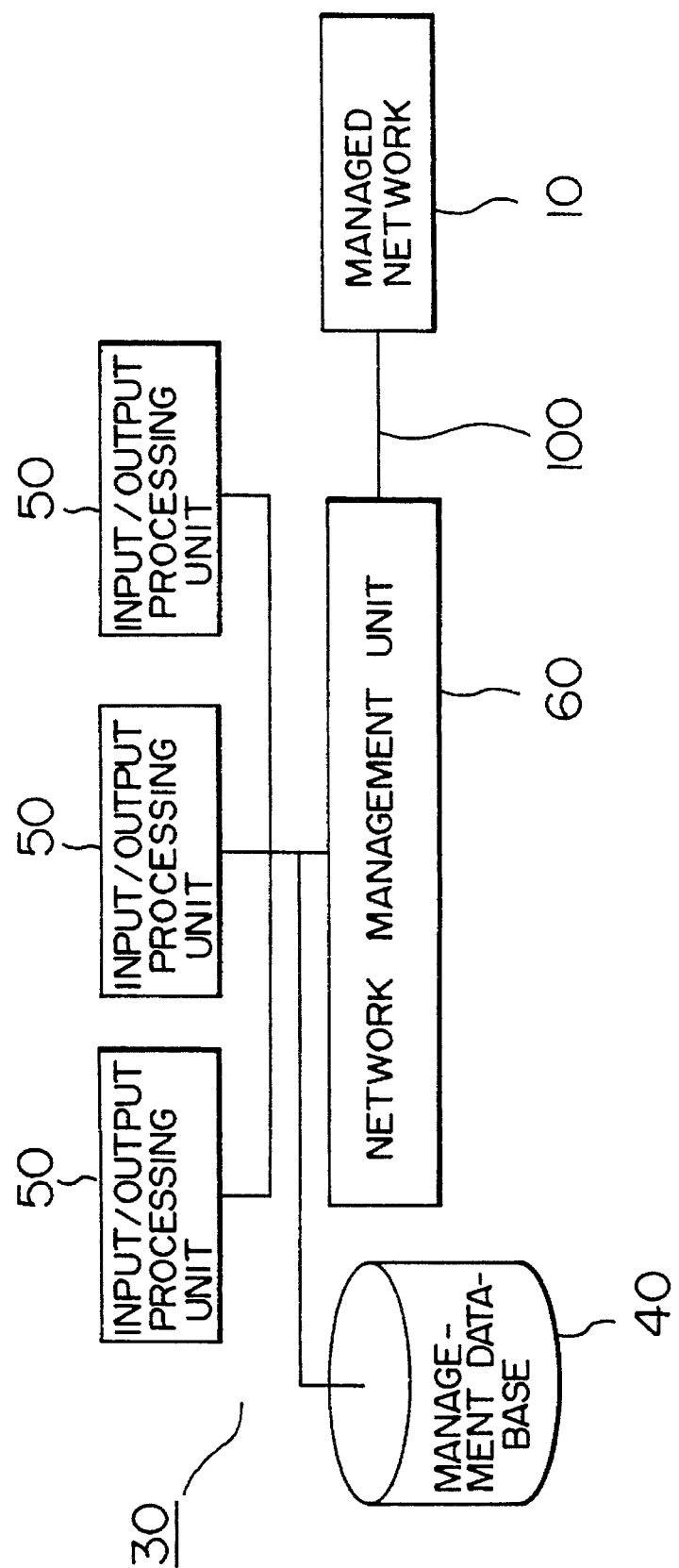
FIG. 26 is a block diagram showing a network management operation system having a plurality of input/output processing units according to an embodiment of the present invention.

FIG. 26 shows an example of the structure of a network management operation system having a plurality of input/output processing units. Each input/output processing unit 50 receives the management operation control command from an operator independently from other input/output processing units. The inputted management operation control command is transmitted to the network control unit 60. The network control unit 60 generates an operation message and transmits it to the object instance of the network 10. The structures of the input/output processing unit 50 and management information data base 40 are the same as the first embodiment.

The network management unit 60 generates the operation message for the same management operation control commands issued from a plurality of input/output processing units, or for each management operation control command issued independently from each input/output processing unit, in accordance with a threshold value 73C set in the input data processing part of the memory 70 shown in FIG. 1, and sends it to each object instance in the network 10.

Figure 27:
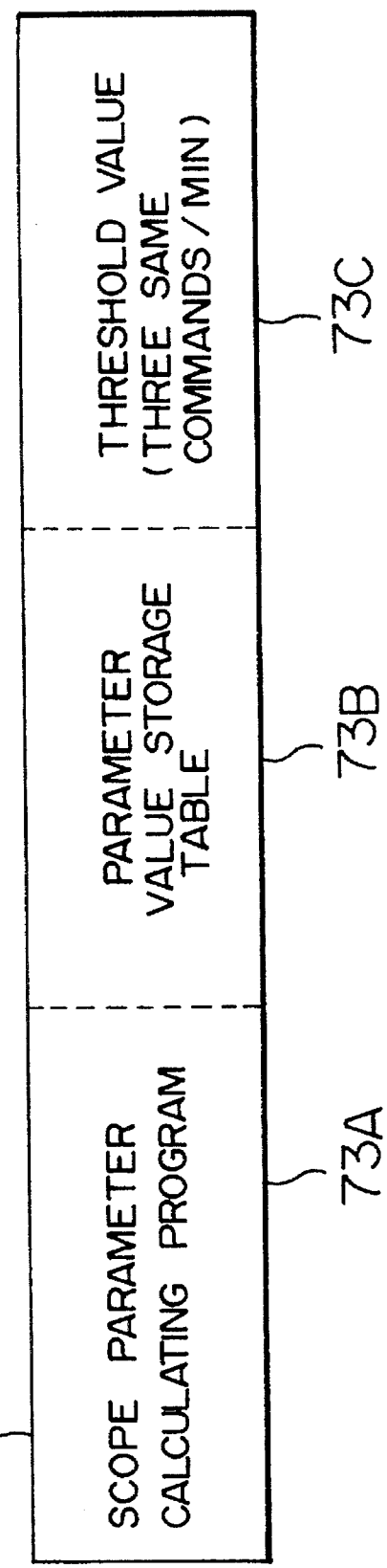
FIG. 27 is a diagram showing the contents of the input data processing part of the memory.

FIG. 27 shows an example of the input data processing part 73 having the threshold value representing three same commands per minute. If three same management operation control commands are issued in one minute from a plurality of input/output processing units, these three commands are collectively processed as a single integral command, and the corresponding single operation message is generated by the network management unit and transmitted to each object instance of the network 10. If same management operation control commands less than three per one minute are issued from a plurality of input/output processing units, a CMIS operation message is generated independently for each management operation control command. This is because the overhead required to process a plurality of such control commands as a single control command increases and the efficiency is lowered if the occurrence frequency of the same control command is not high.

Next, the operation of the network management operation system having a plurality of input/output processing units will be described, taking as an example the case wherein each input/output processing unit independently receives the management operation control command, same control commands are collectively processed as a single control command to perform the corresponding management operation, and the management operation results are displayed at each input/output processing unit. The procedure of the operation is illustrated in the flow chart of FIG. 28.

Figure 28:
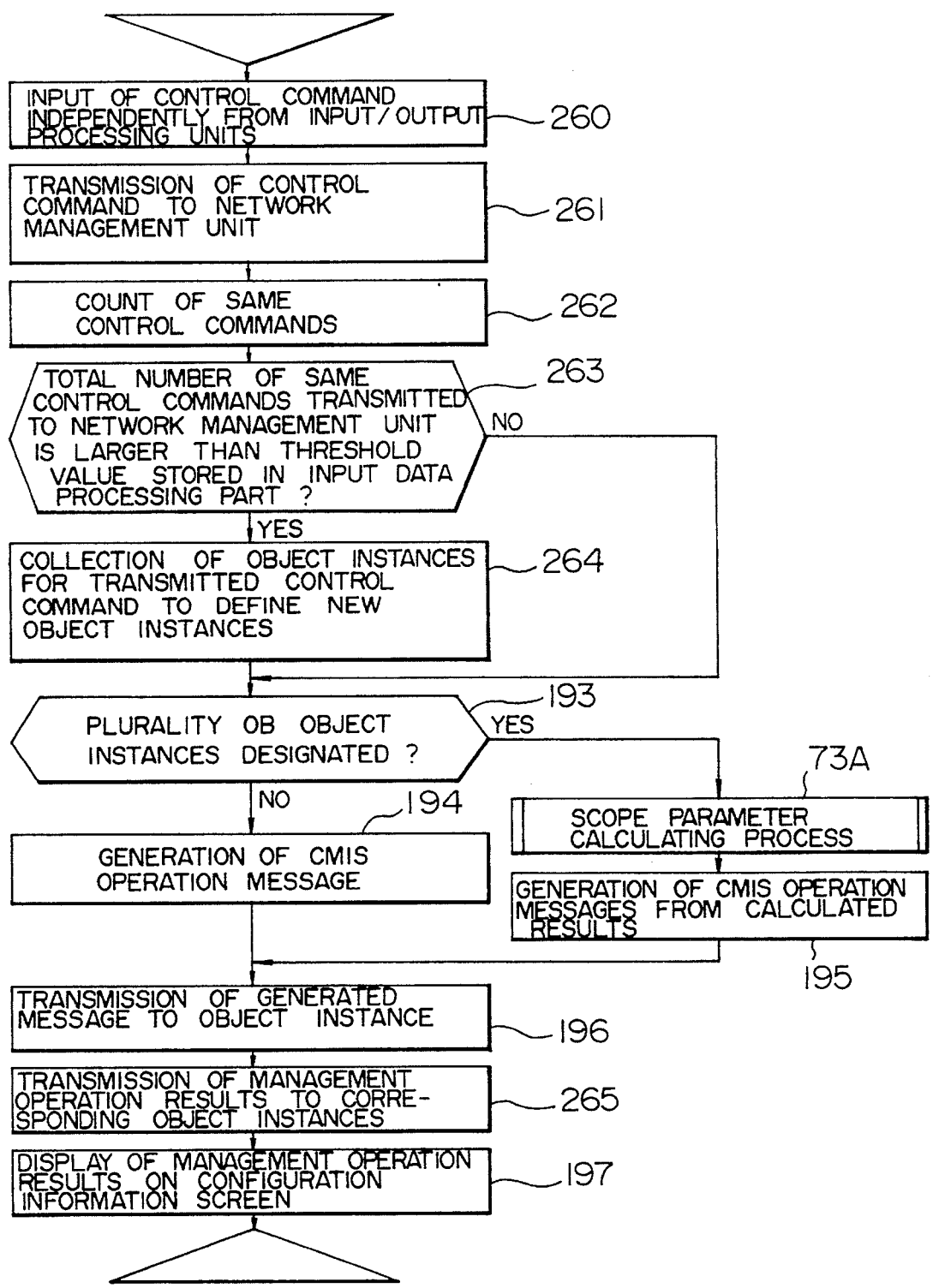
FIG. 28 is a flow chart explaining the operation of the network management operation system having a plurality of input/output processing units according to the present invention.

Each input/output processing unit 50 receives the management operation control command (e.g., management operation type, related detailed information, and object instance designation) from an operator in the independent manner like the first embodiment (Step 260 of FIG. 28).

Each input/output processing unit 50 transmits the management operation control command entered by an operator to the network management unit 60 (Step 261).

The network management unit 60 counts commands having the same management operation type and related detailed information entered from the input/output processing units 50. If the total number of such commands is less than the threshold value 73C, each command is used to generate a corresponding operation message like the first embodiment, and transmitted to each object instance (Steps 193 to 196). The operation results are transmitted to the input/output processing unit 50 which supplied the command.

If the total number of such commands is equal to or more than the threshold value 73C, the network management operation is performed in the following manner.

First, for the management operation control commands having the same management operation type and related detail information entered from the input/output processing units 50, all the object instances for the control commands are collected and newly designated (Step 264). At this time, the information which object instances belong to which input/output processing units is stored. Next, a CMIS operation message is generated for each of the newly designated object instances and transmitted to each object instance in the manner like the first embodiment (Steps 193 to 195).

The generated operation message is transmitted via the communication controller 62 to the corresponding object instance of the network 10 (Step 196). Lastly, the management operation results for each object instance are transmitted to the input/output processing unit 50 which designated the object instance which can be identified from the information previously stored in the memory (Step 265). If the management operation results in that information to be supplied to the operator is necessary, such information is displayed on the CRT display device 52 at the input/output processing unit 50 (Step 197).

According to the second embodiment, an operator of the network management operation system can efficiently perform the management operations of the object instances designated by the management operation control commands entered by a plurality of input-output processing units, by using the CMIS scope function of OSI.

Next, another network management operation system according to the third embodiment of the present invention will be described, wherein each operator is assigned a specific management operation privilege level, the network management operation system judges from the privilege level whether the operator is permitted to use the system, and only when the permission is given, the operator can perform the management operation.

Figures 29, 30:
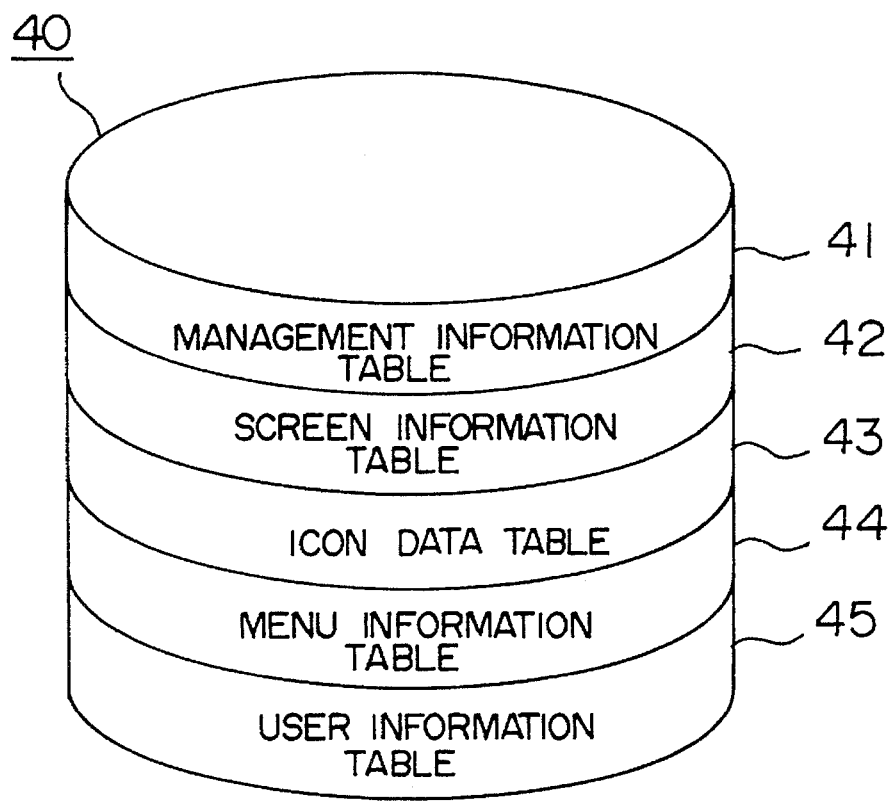
FIG. 29 is a diagram showing the structure of the management information database.
FIG. 30 is a diagram showing the structure of the user information table of the management information table.

The system configuration of the third embodiment is the same as the first embodiment except the management information database 40. As shown in FIG. 29, the management information database 40 stores the data same as the first embodiment, as well as a user information table 45 storing the management operation privilege level of each operator.

FIG. 30 shows an example of the user information table 45 storing users 45A and their management operation privilege levels 45B. In this example, three persons Mr. Tanaka, Mr. Suzuki, and Mr. Sato are registered, and two types of privilege levels "A" and "B" are assigned.

Next, the operation of the network management operation system storing the management operation privilege level of each operator in the management information database 40 according to the third embodiment of the invention will be described, taking as an example of the "DELETE" command for deleting an object instance, wherein the network management operation system judges from the privilege level whether the operator is permitted to use the system, and only when the permission is given, the operator can perform the management operation. In the following description, the management operation privilege level "A" indicates that the deletion process is permitted even if the object instance has lower level object instances, and the privilege level "B" indicates that the deletion process is not permitted if the object instance has lower level object instances. The process of the operation is illustrated in the flow chart of FIG. 31.

Figure 31:
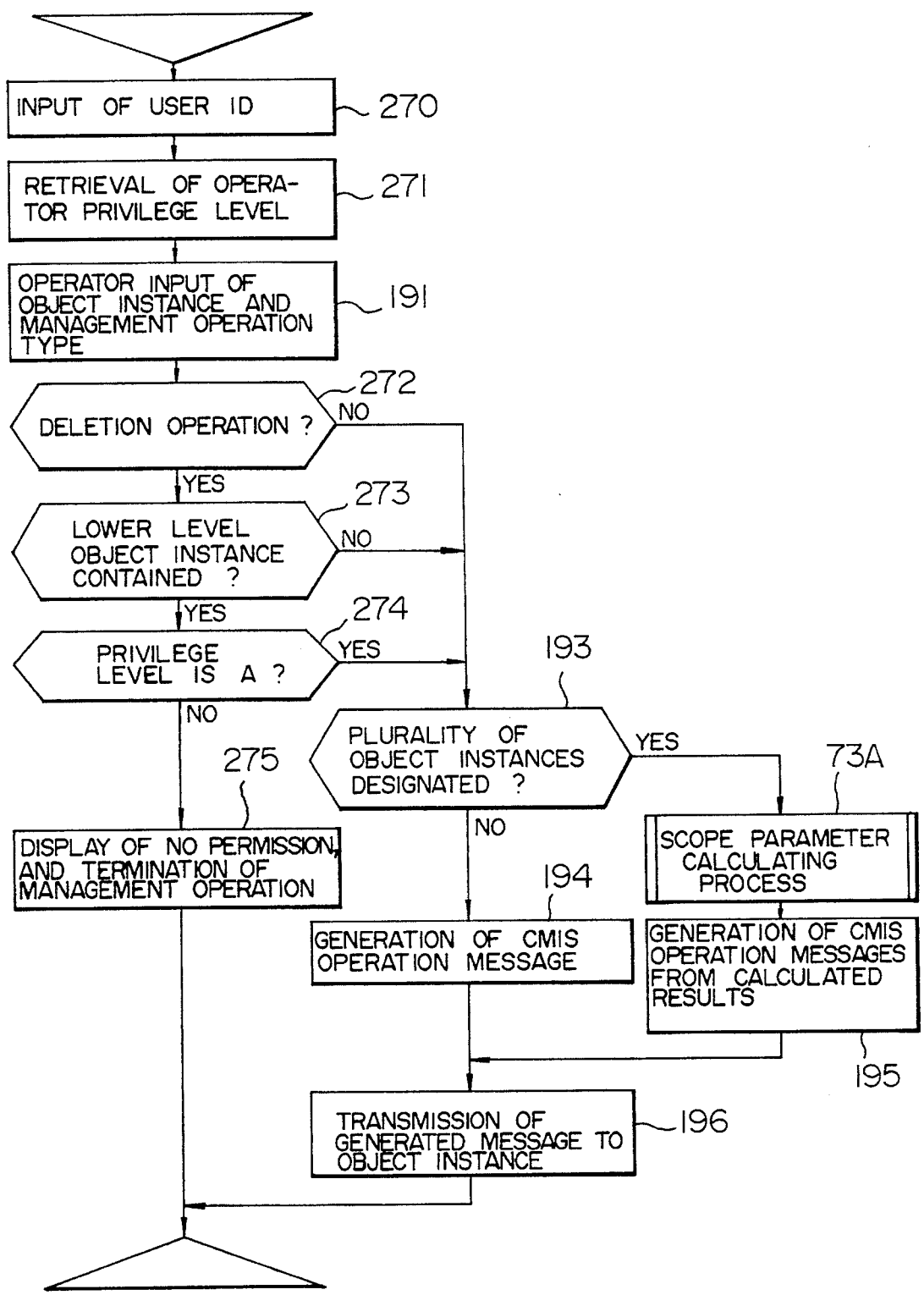
FIG. 31 is a flow chart explaining the management operation with an operation privilege level being assigned to each operator.

Referring to FIG. 31, the network management operation system 30 requests a user ID when an operator accesses the system (Step 270). When the user ID is entered, the network management unit 60 retrieves the privilege level for the user ID from the user information table 45 (Step 271).

In performing the management operation, the operator designates the object instance and management operation type in the manner like the first embodiment, and lastly instructs to execute the management operation by clicking the "Execution" command 44H (Step 191).

If the designated management operation is not the deletion operation (Step 272), the network management unit 60 performs the designated management operation (Steps 193 to 196) in the manner like the first embodiment. If the designated management operation is the deletion operation, the following process is executed.

First, the data block of the object instance to be deleted is retrieved from the management information table 41. If the lower level management information pointer 417 of the retrieved data block is a null (Step 273), i.e., if the object instance to be deleted has no lower level object instance, the management operation is performed in the manner like the first embodiment (Steps 193 to 196). If the pointer 417 is not a null (Step 273), i.e., if the object instance contains a lower level object instance or instances, it is judged from the management operation privilege level of the operator whether the management operation is permitted to be performed (Step 274).

If the privilege level of the operator is "A", the designated management operation is performed in the manner like the first embodiment (Steps 193 to 196). On the other hand, if the privilege level of the operator is "B", a message, for example, "No permission of deleting designated object instance", is displayed on the CRT display unit 52 and the process is terminated without performing the designated management operation (Step 275).

For example, if Mr. Suzuki instructs to delete an object instance, the deletion operation is allowed to be performed irrespective of whether the object instance has a lower level object instance or instances. If Mr. Tanaka or Mr. Sato instructs to delete an object instance, the deletion operation is allowed to be performed only if the object instance has no lower level object instance.

According this embodiment, it is possible to prevent illegal management operations and miss-operations in the network management. Furthermore, a burden on the operator of designating object instances to be deleted can be alleviated.

In the third embodiment, the operator privilege level has no reference to the management information table 41 shown in FIG. 3. The privilege level of an operator permitting a certain management operation (e.g., deletion operation) of an object instance, may be stored in the management information table 41 as the attribute information. With such an arrangement, the privilege level can be dealt with as one of the processes to be executed by the first embodiment.

As the fourth embodiment of the present invention, another network management operation system will be described, wherein in response to a management operation control command from an operator, object instances having an attribute value designated by the operator are selected from the object instance group designated by the operator, and displayed visually distinguishably from other object instances, by using the CMIS scope function and filtering function of OSI.

The system configuration is the same as the first embodiment. In this embodiment, however, when an operator requests the operation status screen within the configuration information screen on the CRT display device 52, i.e., when the "GET" command 44A is designated on the menu 44A–44H and the "operation status" 44I is thereafter designated, an "Attribute value setting" area for the input of the attribute value by the operator is displayed on the configuration information screen.

Figure 32:
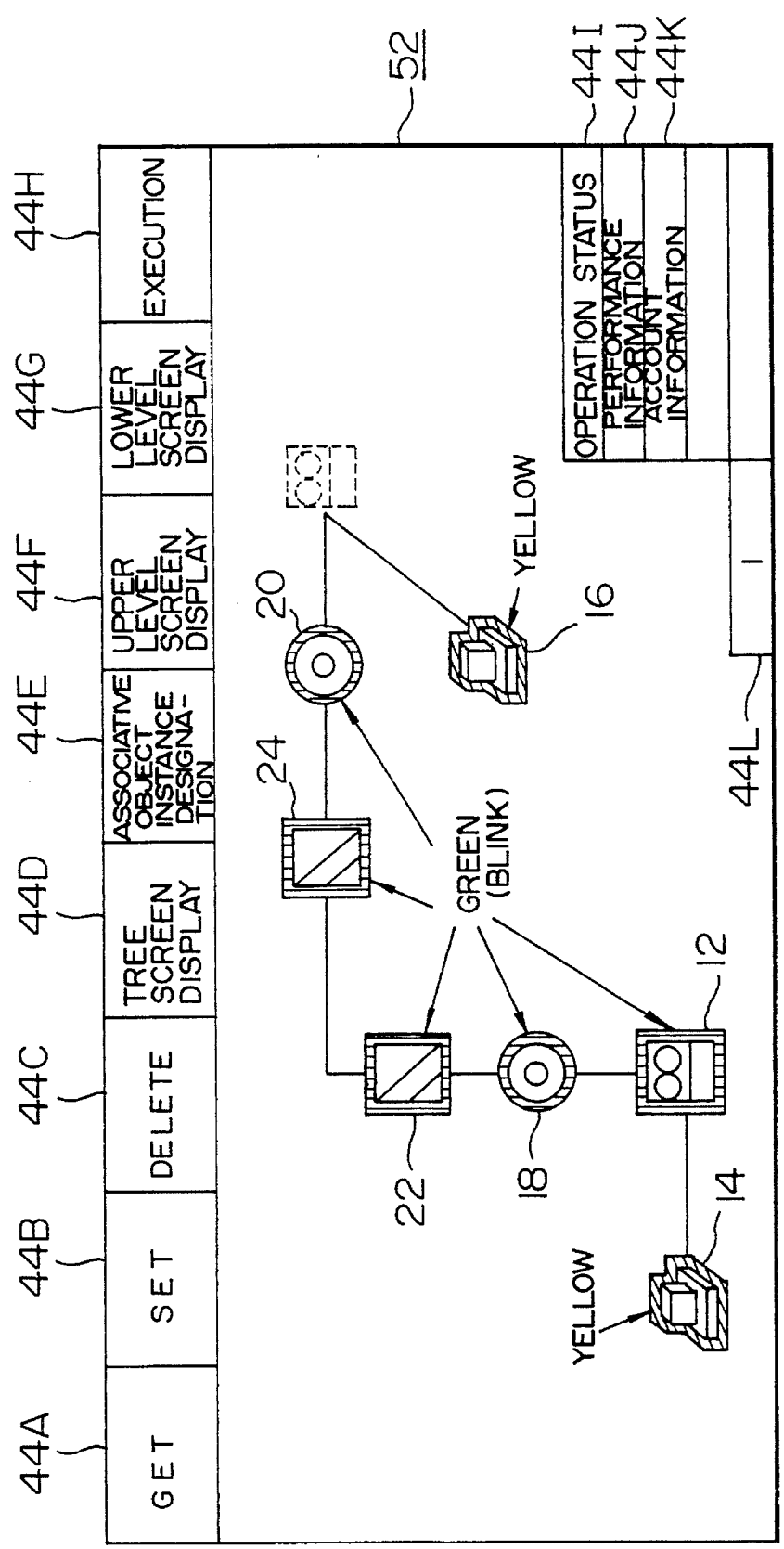
FIG. 32 is a diagram showing an example of a representation of the results of using the filtering function.

FIG. 32 shows an example of the attribute value setting area 44L in which "1" was entered.

Next, the operation of the network management operation system of the fourth embodiment will be described, wherein an object instance having the attribute value designated by an operator is displayed visually distinguishably from other object instances. In the following description, it is assumed that an operator requests to display object instances having the operation status "1".

In the manner described with the first embodiment, after designating an object instance group on the configuration information screen and tree screen, an operator designates the "GET" command 44A in the menu displayed at the upper area of the CRT display device 52 and further designates the "Operation status" 44I.

The network management operation system 30 displays the "Attribute value setting" area 44L on the configuration information screen to request the operator to enter the attribute value. Then, the network management unit 60 generates the CMIS operation message in the manner like the first embodiment, and adds to this operation message the information used for the filtering by the entered attribute value, the information added message being sent to each object instance of the network 10.

FIG. 33 shows an example of the CMIS operation message added with the attribute value used for the filtering.

After performing the management operation, the display elements of the object instances having the attribute value designated by the operator are displayed distinguishably from the display elements of other object instances, for example, the peripheral area of each display element of the object instance having the attribute value is colored green (such as display elements 12 and 18 in FIG. 32) and other display elements are colored yellow (such as display elements 14 and 16 in FIG. 32).

According to this embodiment, an operator of the network management operation system can efficiently perform the management operation of the object instances having a specific attribute value.

As appreciated from the foregoing description of the present invention, the management operation control command for the object instances designated by an operator is automatically mapped in CMIS scope parameters of OSI to generate the operation message for each object instance. Accordingly, an operator can perform an efficient network management operation without worrying about the containment relationship between object instances of the network to be managed.

We claim:

1. A network management operation system connected to a network via a communication line, the network having a plurality of object instances to be managed, said network management operation system, comprising:

a plurality of input/output processing units each having input means and a display screen to be operated by an operator;

a management information database for storing management information including a containment relationship between plurality of object instances of said network to be managed and data of each of said object instances; and a network management unit connected to said plurality of input/output processing units and said management information data base, said network management unit including:

means for generating a new integrated control command from a control command group for object instances having a same attribute independently inputted by a plurality of operators from said plurality of input/output processing units;

means for retrieving said management information of an object instance group in said network designated for said integrated control command, from said management information database, and generating a containment tree (management information having a containment structure) corresponding to the containment relationship between the object instances of said designated object instance group;

means responsive to said integrated control command for determining a scope pattern of Common Management Information Service (CMIS) of Open Systems Interconnection (OSI) in accordance with said containment tree;

means for generating a service message including said determined scope pattern, and transmitting said service message via said communication line to said network; and means for distributing execution results of said service message from said network to each of said input/output processing units in accordance with said object instance group inputted by said plurality of operators.

2. A network management operation system according to claim 1, wherein said network management unit includes:

means for judging whether an occurrence frequency of control commands of said control command group entered by said plurality of operators from said plurality of input/output processing units exceeds a predetermined threshold value; and means for inhibiting an integration operation by said means for generating said new integrated control command if said means for judging judges that the occurrence frequency does not exceed said threshold value.

3. A network management operation system according to claim 1, wherein said management information database further stores attribute information for each of said plurality of object instances within the network, said scope pattern determining means being responsive to a designation of said attribute information by said operator, and determines a filter parameter for selecting an object instance, said filter parameter being determined by a scope parameter determined by said designated control command, and by said designated attribute information, and said means for generating a service message generates a service message including said determined scope parameter and filter parameter, and transmits said service message via said communication line to said network.

4. A network management operation method for a network management operation method connected to a network via a communication line, the network having a plurality of object instances to be managed, said network management operation system, comprising:

a plurality of input/output processing units each having input means and a display screen to be operated by an operator;

a management information database for storing management information including the containment relationship between a plurality of object instances of said network to be managed and data of each said object instance; and a network management unit connected to said plurality of input/output processing units and said management information data base, said network management unit executing the following steps:

(a) generating a new integrated control command from a control command group for object instances having the same attribute independently inputted by a plurality of operators operating said plurality of input/output processing units;

(b) retrieving said management information of an object instance group in said network designated for said integrated control command, from said management information database, and generating a containment tree (management information having a containment structure) corresponding to a containment relationship between the object instances of said designated object instance group;

(c) in response to said integrated control command, determining a scope pattern of Common Management Information Service (CMIS) of Open Systems Interconnection (OSI) in accordance with said containment tree;

(d) generating a service message including said determined scope pattern, and transmitting said service message via said communication line to said network; and (e) distributing execution results of said service message from said network to each of said input/output processing units in accordance with said object instance group inputted by said plurality of operators.

5. A network management operation method according to claim 4, wherein said network management unit further executing the following steps of:

(f) judging whether an occurrence frequency of control commands of said control command group entered by said plurality of operators from said plurality of input/output processing units exceeds a predetermined threshold value; and (g) inhibiting an integration operation if a result of said judging indicates that the occurrence frequency does not exceed said threshold value.

6. A network management operation method according to claim 4, wherein said management information database further includes storing attribute information for each of said plurality of object instances within the network, and wherein in step (c), in response to a designation of said attribute information by said operator, determining a filter parameter for selecting an object instance, said filter parameter being determined by a scope parameter determined by said designated control command, and by said designated attribute information, and in step (d), a service message including said determined scope parameter and filter parameter is determined and transmitted via said communication line to said network.

* * * * *